US012246976B2

(12) United States Patent
Woods

(10) Patent No.: US 12,246,976 B2
(45) Date of Patent: Mar. 11, 2025

(54) IN SITU FLUID DIFFUSION APPARATUS AND SYSTEM

(71) Applicant: Rhizoscape Technologies Pty Ltd, Grange (AU)

(72) Inventor: Timothy Edwin Woods, Adelaide (AU)

(73) Assignee: Rhizoscape Technologies Pty Ltd, Grange (AU)

( * ) Notice: Subject to any disclaimer, the term of this patent is extended or adjusted under 35 U.S.C. 154(b) by 0 days.

(21) Appl. No.: 18/558,427

(22) PCT Filed: May 2, 2022

(86) PCT No.: PCT/AU2022/050409
§ 371 (c)(1),
(2) Date: Nov. 1, 2023

(87) PCT Pub. No.: WO2022/232871
PCT Pub. Date: Nov. 10, 2022

(65) Prior Publication Data

US 2024/0228345 A1 Jul. 11, 2024

Related U.S. Application Data

(60) Provisional application No. 63/182,888, filed on May 1, 2021.

(51) Int. Cl.
*C02F 3/04* (2023.01)
*A01G 25/00* (2006.01)
(Continued)

(52) U.S. Cl.
CPC .............. *C02F 3/046* (2013.01); *A01G 25/06* (2013.01); *C02F 1/001* (2013.01); *C02F 3/043* (2013.01);
(Continued)

(58) Field of Classification Search
CPC .... C02F 3/046; C02F 3/043; C02F 2103/005; C02F 1/288; C02F 1/001; C02F 2203/006;
(Continued)

(56) References Cited

U.S. PATENT DOCUMENTS 4,192,628 A 3/1980 Gorman
4,523,613 A * 6/1985 Fouss ...................... E03F 1/003
138/121
(Continued)

FOREIGN PATENT DOCUMENTS

WO 0171112 A1 9/2001

OTHER PUBLICATIONS

Definition of "either" by Cambridge Dictionary (Year: None).*
(Continued)

*Primary Examiner* — Liam Royce
(74) *Attorney, Agent, or Firm* — Whitestone Law, PLLC

(57) ABSTRACT

Some embodiments are directed to a tunnel device for use in single pass sand filtration (SPSF) systems, including curved lateral walls which meet at an apex channel having a flat top, an open bottom, and side vented walls. The interaction between the characterizing components and vertically streamed treated wastewater from a pressurized pipe results in the maximized lateral transport of the treated wastewater towards the side vented walls and the adjacent soil strata therethrough which contains aerobic microbial communities able to decompose organic wastewater material thereby delivering enhanced wastewater treatment and water volume reductions through evapotranspiration.

6 Claims, 18 Drawing Sheets

(51) Int. Cl.

| | |
|---|---|
| ***A01G 25/06*** | (2006.01) |
| ***C02F 1/00*** | (2023.01) |
| ***C02F 103/00*** | (2006.01) |
| ***F16L 3/02*** | (2006.01) |

(52) U.S. Cl.
CPC ........ *A01G 25/00* (2013.01); *C02F 2103/005* (2013.01); *F16L 3/02* (2013.01)

(58) Field of Classification Search
CPC . A01G 25/06; A01G 25/00; F16L 3/02; E03F 1/003; E03F 1/002; E03F 5/101; E03F 11/00
See application file for complete search history.

(56) References Cited

U.S. PATENT DOCUMENTS

| | | | | |
|---|---|---|---|---|
| 4,588,325 | A | 5/1986 | Seefert | |
| 5,401,116 | A * | 3/1995 | Nichols | E03F 1/003 405/48 |
| 5,890,837 | A | 4/1999 | Wells | |
| 7,413,381 | B1 | 8/2008 | Bracone | |
| 10,232,416 | B1 | 3/2019 | Robinson et al. | |
| 10,472,813 | B1 * | 11/2019 | Sipaila | E03F 1/003 |
| 2014/0212219 | A1 | 7/2014 | Jowett | |
| 2015/0230416 | A1 | 8/2015 | Lo | |

OTHER PUBLICATIONS

Aug. 29, 2023 International Preliminary Report on Patentability issued on International Application No. PCT/AU2022/050409.
Aug. 12, 2022 International Search Report issued on International Application No. PCT/AU2022/050409.

* cited by examiner

IN SITU FLUID DIFFUSION APPARATUS AND SYSTEM

TECHNICAL FIELD

The technical field relates to improved single pass sand filtration (SPSF) systems adapted for use in on-site wastewater systems such as septic-tank effluent, and components for the adaptation of existing SPSF systems. In particular, the field relates to an SPSF irrigation apparatus and SPSF systems and methods incorporating such apparatus.

BACKGROUND

Single pass sand filtration (SPSF) systems are commonly used as on-site wastewater treatment systems for the treatment of effluent, such as septic-tank effluent. SPSFs have a long history of servicing individual households, buildings on sub-divided properties, mobile home parks, rural schools, small communities, and other situations in which small wastewater flows are generated.

Various mechanisms are typically involved in the treatment of wastewater in SPSFs. These include a combination of physical filtering of solids, ion exchange (alteration of compounds by binding and releasing their components), and aerobic decomposition of organic waste by soil-dwelling bacteria; as well as other biological, chemical and physical interactions.

Physical and chemical sanitation mechanisms can be directly and easily modulated and optimized; however aerobic decomposition is affected indirectly by optimizing growth conditions for the desired consortium of microorganisms, plants and rhizobiome that promote decomposition. For this reason, aerobic decomposition is typically very difficult to optimize or enhance. The efficacy of aerobic decomposition is highly variable and is dependent on a number of biological factors, in particular the maintenance of aerobic conditions to promote and sustain the growth of the aerobic bacteria and plants that are required in sufficient numbers to decompose the volume of organic waste from the effluent stream.

Typical SPSF-type wastewater treatment beds consist of a perforated subterranean pipe which is dosed at intervals (determined by soil properties) to permit treatment and disposal of effluent by bacterial action, soil filtration, evaporation, transpiration, and soil absorption. Shallow rooted plantings can further improve evapotranspiration which assists in the removal of excess water in the system to prevent the accumulation of moisture and thereby the generation of anaerobic soil conditions.

Aerobic conditions in SPSFs are typically maintained with the use of intermittent dosing of air and/or the cycling of wastewater between multiple filter beds, this allows for rest periods during the transfer of wastewater between filter beds and prevents ponding, i.e. the pooling of water in a specific location. Appropriate selection of sand media grain size and loading rates also impact gaseous exchange and can promote airflow within the treatment medium.

Aerobic decomposition is not only impacted by physical and environmental factors regulating the growth and metabolism of aerobic microbial communities capable of decomposing organic matter in sand and soil, but it is also impacted by competition on these microbial communities by anaerobic bacteria which diminish population densities of aerobic microorganisms. Optimization of physical conditions in SPSFs can therefore also be modulated to have a two-way effect on aerobic decomposition; physical conditions can be modulated to simultaneously promote aerobic microbial communities and diminish anaerobic communities, thereby having a cumulative effect on microbial decomposition.

The treatment performance and operating lifetime of an SPSF system is dependent on a number of factors, key among these being particle size distribution of the sand media, hydraulic distribution properties of dosed wastewater and the relative proportion of so-called 'dead zones', wastewater loading/dosing regime and associated potential for oxygen transfer to wastewater for biological activity. The poor performance and premature failure of SPSF systems from clogging is a well-recognized limitation SPSF processes in wastewater treatment.

Typical SPSF-type beds are designed according to guidelines which only allow for the downward vertical flow of treated water to the underlying soil profile. Such design approaches encourage the transport of the wastewater away from the soil strata containing aerobic microbial communities able to decompose organic wastewater material. Current design approaches fail to recognize the need to maximize lateral (horizontal) and upward vertical transport of water to adjacent soil profiles which can both deliver enhanced wastewater treatment and also water volume reductions through evapotranspiration processes.

With a focus on the downward vertical flow of wastewater there has been no optimization of the lateral (horizontal) or upward vertical transport of the treated water in the art, and systems which achieve limited lateral transport do so incidentally, and provide any additional benefits inefficiently.

It is proposed that new approaches to SPSF bed design and/or components thereof may effectively increase the hydraulic operating performance of treatment systems by enhancing water distribution throughout the bed area and reducing dead zones. They may also improve the potential for oxygen transfer to the treatment system by providing enhanced air/water exposure of the sand media to oxygen transfer and/or by optimizing the dosing frequency and wetting/drying cycles within the sand media. Design improvements may enhance sanitation performance by improving physical and chemical conditions as well as enhancing anaerobic degradation by microbial communities resident in the soil strata. Additionally, such improvements may also reduce the potential for system failure due to clogging.

It is envisaged that improvements to components typically utilized in SPSF systems may also be applied to the management of native soils in the absence of an SPSF system, for example to manage irrigation conditions where more uniform moisture conditions are required across soil strata, or upward vertical transport is required to irrigate shallow root systems. Regulation of moisture in soils may enhance water conservation, improve microbial activity in soil strata and reduce oversaturation of soils. They may consequently improve agricultural yield or the degradation of waste in soils.

SUMMARY

Embodiments of the invention relate to an irrigation apparatus for the diffusion of a gas and liquid mixture within a soil or aggregate environment comprising; a rigid tunnel elongated along a length, having an outer surface formed as a substantially convex surface and an inner surface formed as a substantially concave surface, wherein the inner surface of the rigid tunnel defines one or more channel sections formed along the length of the tunnel, the one or more channel sections comprising, a substantially horizontal, planar channel base positioned at a tunnel apex, and opposing channel sides having multiple apertures formed therethrough, located in proximity to the channel base.

Channel sections are preferably formed as substantially c-shaped. Preferably, the channel walls are substantially parallel to one another, and/or are preferably substantially perpendicular to the channel base.

In preferred embodiments, the one or more channel sections form on or more planar channel bases that align longitudinally substantially in a single plane.

Gas and liquid mixtures preferably comprise wastewater from septic-tank effluent but may also comprise rain water, liquid fertilizer, liquid animal waste, or other liquids both viscous and non-viscous. The mixture may comprise waste gases or other gases to form a mixture of gaseous and liquid particles.

Pressurization is preferably achieved by a pump or pumps or alternatively may be achieved by gravity feed systems or other systems suitable for the pressurization of fluids within the fluid pipe.

As used herein the term 'soil' is to be understood to define soils, including but not limited to organic remains, clays, sands, aggregates, rock particles, or mixtures thereof, and may include rock and aggregate only. A soil or aggregate environment comprises any of the preceding materials, materials typically understood as being defined by the term 'soil' as well as environments entirely or predominantly comprising aggregate and rock mixtures.

As used herein the term 'rigid' is to be understood to define a general inability to bend or flex a material, and is not to be understood to be limited to an absolute inability to bend or flex a material. The term defines, but is not limited to, a resistance to bending or flexing under nominal conditions.

As used herein the terms 'convex' and 'concave' are to be understood as having a meaning from the perspective of the context provided. More specifically, the outer surface being substantially convex in the context of the rigid tunnel is to be understood as such from the perspective of outside the rigid tunnel towards the outer surface while the inner surface being substantially concave is to be understood as such from the perspective of inside the rigid tunnel towards the inner surface.

In preferred embodiments of the invention the rigid tunnel is shaped substantially in the form of a catenary arch having lateral corrugations repeating along the length of the tunnel comprising multiple outwardly corrugated portions interspersed by inwardly corrugated portions.

As used herein the term 'catenary arch' is to be understood as including, but not being limited to, inverted catenary shapes, funicular arches, parabolic arches. Other mechanically equivalent shapes to the catenary arch will be understood as being included in the meaning of the term 'catenary arch'.

Rigid tunnels preferably comprise plastic moldings with an inverted catenary arch profile but may also include substantially triangular shaped profiles or alternatively other profiles able to substantially cover the fluid pipe.

As used herein the term 'corrugations' is to be understood to describe a material having a surface shaped with repeating peaks and troughs which may be rounded, stepped, or any other shape.

In preferred embodiments of the invention the rigid tunnel further comprises a structural spine positioned on the outer surface of the rigid tunnel at the tunnel apex wherein the structural spine is configured to provide weight bearing structural support along the length of the tunnel.

In further embodiments the structural spine is formed in portions, each portion of the structural spine being formed within a space between the outwardly corrugated portions of the rigid tunnel defined by the inwardly corrugated portions of the tunnel, and each portion of the structural spine comprises a substantially horizontal, planar spine base and multiple vertical longitudinal walls perpendicularly intersecting multiple vertical sectional walls, configured to provide weight bearing structural support along the length of the tunnel.

Further embodiments of the invention may also relate to the diffusion of a pressurized gas and liquid mixture wherein the rigid tunnel further comprises one or more structural members characterized in their ability to increase the resistance of the tunnel to compressive and expansive forces.

Structural members according to preferred embodiments may be comprised of ribs attached to a surface of the tunnel, or alternatively may be comprised of lattices or staked supports.

In preferred embodiments of the invention the rigid tunnel comprises a tunnel base formed along the length of the tunnel at either edge of the rigid tunnel for maintaining the rigid tunnel at a desired position, each outwardly protruding lateral corrugation is wider at the tunnel base than the tunnel apex, and the outwardly protruding lateral corrugations comprise apertures formed therethrough in proximity to the tunnel base.

In further embodiments the apertures formed through the rigid tunnel are elongated, the apertures positioned in proximity to the channel base are configured to vent aerosolized liquid therethrough and the apertures positioned in proximity to the tunnel base are configured to vent liquid within the rigid tunnel therethrough.

In preferred embodiments the irrigation apparatus further comprises a perforated fluid pipe adjacent to the inner surface of the rigid tunnel having perforations along a length positioned to substantially align with the channel base, one or more supporting means for holding the fluid pipe at a position to substantially align with the channel base, whereby the irrigation apparatus is adapted to receive a pressurised gas and liquid mixture within the perforated fluid pipe, and the perforated fluid pipe is positioned to direct the pressurised mixture through the perforations in the pipe to strike the channel base and aerosolize the mixture.

Fluid pipes preferably comprise plastic water pipe but may also comprise rubber or plastic tubing, copper piping, or the like. Fluid pipes alternatively may comprise solid ventilation ducting, flexible ducting, plastic ducting, or the like.

The perforations in the fluid pipe preferably comprise holes drilled or cut into the pipe but may also comprise nozzles or prefabricated elements. The perforations alternatively may comprise vents or diffusers.

In preferred embodiments the irrigation apparatus further comprises an absorbent membrane liner adjacent to the outer surface of the rigid tunnel configured to direct the movement of moisture therethrough. Preferably, the liner comprises a fabric liner or a geomembrane.

Embodiments of the invention also relate to a system for the diffusion of a gas and liquid mixture within a soil or aggregate environment comprising; a rigid tunnel elongated along a length, having an outer surface formed as a substantially convex surface and an inner surface formed as a substantially concave surface, wherein the inner surface of the rigid tunnel defines one or more channel sections formed along the length of the tunnel, the one or more channel sections comprising, a substantially horizontal, planar channel base positioned at a tunnel apex, and opposing channel sides having multiple apertures formed therethrough, located in proximity to the channel base.

As used herein the term 'diffusion' is to be understood to define any complete or partial net transfer of a substance from a region of high concentration to a region of lower concentration within any medium. The mechanisms of diffusion within air, soil, or other medium may differ without altering the scope of the term 'diffusion'. Diffusions of fluids are to be understood as being both within the scopes of Brownian and non-Brownian fluid mechanics.

In further embodiments the system comprises an absorbent membrane liner adjacent to the outer surface of the rigid tunnel configured to direct the movement of moisture therethrough.

In further embodiments the system comprises a perforated fluid pipe adjacent to the inner surface of the rigid tunnel having perforations along a length positioned to substantially align with the channel base, and one or more supporting means for holding the fluid pipe at a position to substantially align with the channel base, whereby the irrigation apparatus is adapted to receive a pressurised gas and liquid mixture within the perforated fluid pipe, and the perforated fluid pipe is positioned to direct the pressurised mixture through the perforations in the pipe to strike the channel base and aerosolize the mixture.

It will be understood to those skilled in the art that the positioning of the fluid pipe to direct the pressurised mixture through the perforations and strike the channel base will redirect a volume of the mixture towards the channel sides and the apertures therethrough. The effect of this redirection is that the volume of the mixture will be diffused into the soil or aggregate environment near the top of the tunnel and allow floral systems located in that area to access the diffused mixture therein. The aerosolised mixture within the tunnel is spread about the soil or aggregate environment at the base of the tunnel and diffuses therein to be accessed by floral systems at this lower level. Those skilled in the art will recognise that systems known in the art diffuse fluid to the lower level soil or aggregate environment but may only access the environment near the top of the system unintentionally and inefficiently.

Thus, embodiments of the invention also relate to the positioning of the fluid pipe to direct the pressurised mixture through the perforations towards the channel base. Impact of the mixture against the channel base producing a redirection of a volume of the mixture towards the channel sides and the apertures therethrough for diffusion into the soil or aggregate environment located in proximity to the one or more channel sections.

Embodiments of the invention also relate to a method for the diffusion of a gas and liquid mixture within a soil or aggregate environment comprising the steps of; preparing a substructure within a soil or aggregate environment; obtaining a rigid tunnel elongated along a length, having an outer surface formed as a substantially convex surface and an inner surface formed as a substantially concave surface, wherein the inner surface of the rigid tunnel defines one or more channel sections formed along the length of the tunnel, the one or more channel sections comprising, a substantially horizontal, planar channel base positioned at a tunnel apex, and opposing channel sides having multiple apertures formed therethrough, located in proximity to the channel base; obtaining a perforated fluid pipe; obtaining one or more supporting means for holding the fluid pipe at a position to substantially align with the channel base; obtaining a gas and liquid mixture and a fluid pump; connecting the fluid pipe to the gas and liquid mixture; securing the one or more supporting means to the substructure or soil or aggregate environment; securing the fluid pipe to the one or more supporting means to position the perforations through the fluid pipe in an upward orientation; placing the rigid tunnel lengthwise upon the fluid pipe at a position to substantially align the perforations with the channel base; covering the rigid tunnel with soil or aggregate; connecting the fluid pump and pumping the gas and liquid mixture through the fluid pipe.

In preferred embodiments the method comprises the further steps of; covering the rigid tunnel with an absorbent membrane liner configured to direct the movement of moisture therethrough; operating the fluid pump at regular time intervals.

In preferred embodiments the method comprises the further steps of; excavating the soil or aggregate environment; partially filling the excavated area with a layer of filtration sand and a layer of aggregate; covering the rigid tunnel and absorbent membrane liner to approximately ground level.

In further embodiments the method comprises the further step of planting flora within the soil or aggregate environment located in proximity to the tunnel apex.

The supporting means adapted to maintain the perforated fluid pipe preferably comprises a pipe clip configured to surround at least part of the perimeter of the pipe, a supporting arch defined by two supporting legs, each supporting leg further comprising a stabilizing platform configured to maintain rotational orientation about the pipe, and a stake configured to prevent translational movement of the supporting means, wherein the stabilizing platform extends laterally from each of the supporting legs and the stake is located at the bottom of each of the supporting legs for insertion into a ground surface.

Supporting means according to embodiments of the invention preferably comprise a bipod able to be staked into the ground and firmly clipping to the fluid pipe or perforated fluid pipe in order to provide support but may comprise a tripod, single stake stand, or other supporting means independent from the tunnel. Alternative embodiments of the invention may comprise a supporting means attached to the tunnel and supporting the fluid pipe thereon.

As used herein, the term "substantially" used in connection with the term "surface", for example "substantially flat surface", "substantially level surface", "substantially smooth surface" or the like is to be understood as a surface approximately or entirely flat, level, smooth etcetera within tolerances of manufacturing but may also include a surface with a large arc radius as to be considered flattened in comparison to the peak of the substantially arched shape of the tunnel or alternatively a convex shape in opposite orientation to the substantially arched shape of the tunnel.

Apertures in the rigid tunnel are preferably outlets or openings which are suitable for both liquid and gaseous evacuation from within the tunnel to outside of the tunnel or alternatively mesh or other materials able to allow drainage and diffusion.

A jet of fluid is to be understood as being a stream of fluid resulting from a pressure differential across a boundary such as across the threshold of a nozzle, aperture, or orifice between the fluid pipe and the internal cavity of the tunnel. A spray of fluid is similarly to be understood as being a substantially aerosolized form of the fluid, particularly when propelled under pressure.

Further embodiments of the invention may also relate to the diffusion of a pressurized gas and liquid mixture wherein the tunnel further comprises one or more lower vents characterized in that they are at a location on the wall of the tunnel which is lower than the channel walls.

The lower vents may be used for spillover under the condition that the ground under the tunnel becomes over-saturated or wastewater is made to pass through the lower vents through some other mechanism. Alternatively, a spill over pipe located at or near the bottom-most surface of the tunnel.

Further embodiments of the invention may also relate to the diffusion of a pressurized gas and liquid mixture further comprising tunnel end caps and a wastewater pipe end cap, wherein the tunnel end caps substantially seal one or more ends of the tunnel to complete the enclosure of the internal cavity, and the wastewater pipe end cap seals an end of the wastewater pipe to allow pressurization therein.

Alternative embodiments of the end caps may comprise a sealant or covering wherein substantially the same effect is achieved.

Further embodiments of the invention may also relate to the diffusion of a pressurized gas and liquid mixture further comprising inspection points characterized in that they allow access between a surface level and the internal cavity of the tunnel.

Current single pass sand filter-type systems are configured to allow for primarily downward vertical transport of water through the sand bed, with limited scope for lateral (horizontal) to the adjacent soil environment, or upward vertical movement of water to the rhizobiome or shallow root zone. The design and structure of the irrigation apparatus permits and optimizes the lateral spray of the fluid through the one or more apertures proximal to the channel base, facilitating greater lateral (horizontal) transport of water to the adjacent soil or aggregate environment.

From the lateral soil or aggregate environment, water is absorbed through the soil or aggregate environment, or may be wicked with the aid of an absorbent membrane liner, upwardly to the root zone of shallow plants to promote the removal of water from the soil surface through evaporation or through plant transpiration.

This, in turn, provides improved hydraulic distribution (hydraulic residence time) of water as well as enhanced contact with adjacent native soil and the flora located therein; potentially enhancing wastewater treatment efficacy through physical, chemical and biological means and lowering the hydraulic pressure on the sand filter.

By dosing water at two zones within the bed (upper to soil via channel wall apertures and lower through normal downward filtration through sand) the tunnel device allows for simultaneous distribution of water to two soil horizons (layers) for improved evapotranspiration and wastewater treatment.

Improved lateral transport of water to the adjacent soil strata may deliver both enhanced wastewater treatment and improved water volume reductions through evapotranspiration processes by delivering water closer to the soil-atmosphere interface and plant root zone. Dual zone water dosing also allows for reduced downward water flow velocity through the combined sand and soil bed, providing for a longer hydraulic residence time within the bed for the promotion of unsaturated flow conditions, thereby yielding improved oxygen transfer and longer contact times of percolating water with in-situ microbial biofilms.

Thus, embodiments may comprise the use of the irrigation apparatus in single pass sand filter-type systems. However, embodiments may alternatively comprise the use of systems for the diffusion of pressurized fluid from beneath a tunnel to an external environment. Such environments may comprise native soils. Improvements arising from the lateral spray of fluids beneath the tunnel device into the soil strata may also be observed in native soils. The resulting physical, chemical and biological benefits from the dispersion of fluids in native soils may improve transpiration, aerobic metabolism of soil microbiome or physical dispersal of moisture in the soil. Such uses may modulate and optimize the soil strata to improve the physical properties of soil, the microbiome of soil strata and the microbiome of plant rhizosphere. The capacity to modulate such factors in agricultural production may enhance plant yields or may transform effluent waste stream to accessible and beneficial feedstocks for agricultural production. Accordingly, further embodiments may comprise the use of a system for the diffusion of pressurized fluid from beneath a tunnel to an external environment. In preferred embodiments such systems are optimized for use in soils, either native soils or soil environments in single pass sand filter-type systems.

Methods of manufacturing tunnels devices according to embodiments of the invention preferably comprise plastic injection molding using a fabricated die wherein the fabricated die is able to produce a length of tunnel.

Custom components of systems for the diffusion of pressurized fluid from within the tunnel to an external environment are preferably manufactured by similar methods and utilizing similar materials as those deployed in the manufacture of tunnel devices. These may include support members and/or end caps according to embodiments.

Preferably, perforated pipes according to embodiments may be manufactured by generating the required number, position and orientations of perforations within standard polyvinyl chloride pipe ware.

The invention now will be described with reference to the accompanying drawings together with the Examples and the preferred embodiments disclosed in the detailed description. The invention may be embodied in many different forms and should not be construed as limited to the embodiments described herein. These embodiments are provided by way of illustration only such that this disclosure will be thorough, complete and will convey the full scope and breadth of the invention.

DETAILED DESCRIPTION OF PREFERRED EMBODIMENTS

Figure 1:
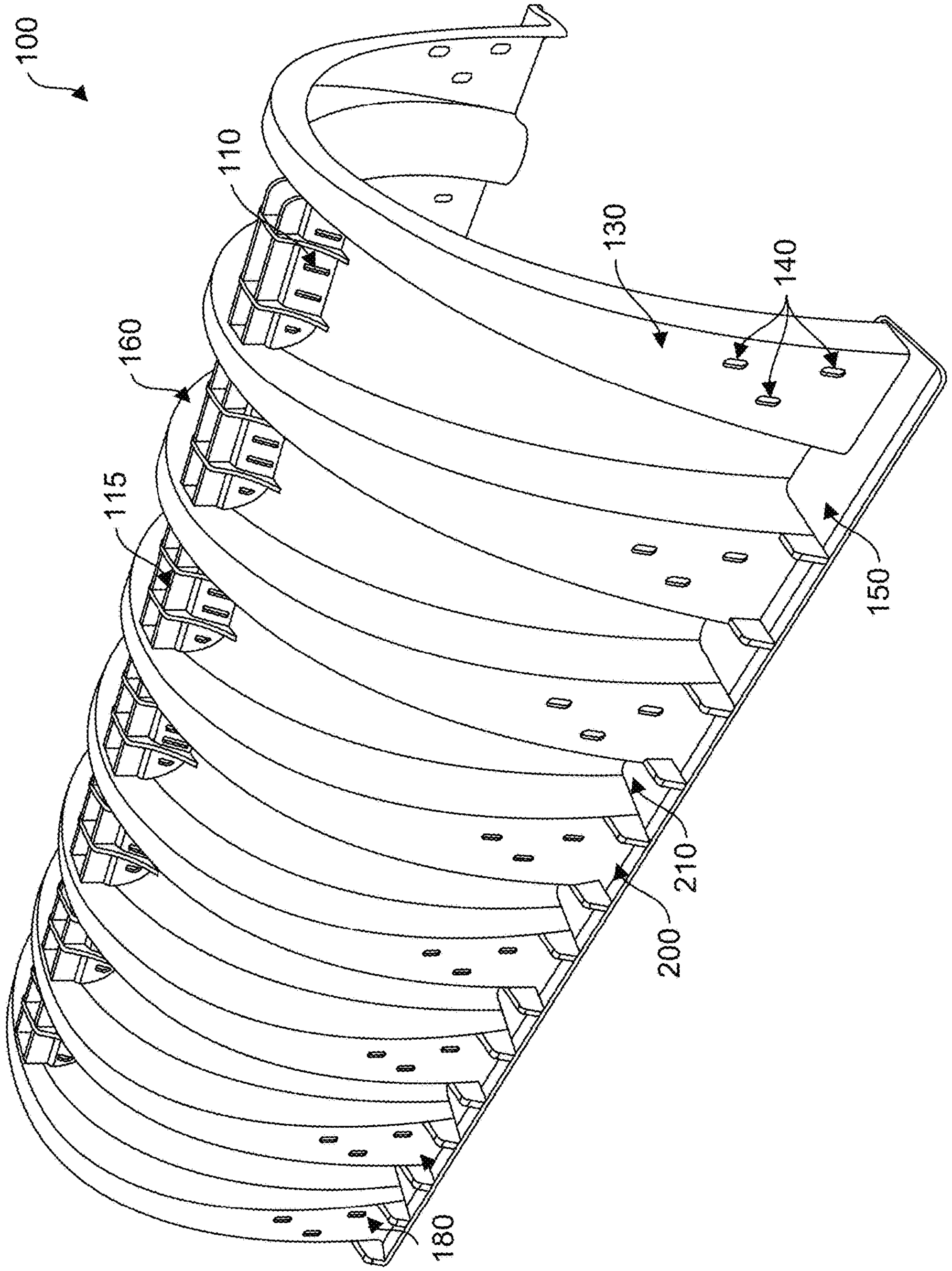
FIG. 1 illustrates a perspective view of a fluid dispersion tunnel according to embodiments of the invention.

Several embodiments are described in detail below with reference to the Figures. Exemplary embodiments are described to illustrate certain aspects and embodiments of the invention, not to limit their scope, which is defined by the claims. Those of ordinary skill in the art will recognize that a number of equivalent variations of the various features provided in the description that follows may be possible.

Embodiments of the invention described herein were tested, validated an optimized by conducting in situ preliminary trials. The experimental hypotheses tested, the trial conditions, a detailed description of the components and system tested, and the trial results are described as follows.

The broad objective of the trial was to determine whether a new SPSF system configuration, including new component designs, would allow for greater lateral transport of water through the depths of the porous media bed and thereby provide improved hydraulic distribution properties in the surrounding soil structure, as well as more extensive contact with adjacent native soils and, in turn, whether this would provide further enhancements in wastewater treatment efficacy (either physical or biological).

Preliminary Trial Design

The new Aerobic Bottomless Sand-filter Open Release Basal System (ABSORBS) treatment system was validated by testing wastewater treatment performance, including any improvement in water flow distribution throughout the gravel and sand media bed arising from the use of the new tunnel design or any improvement in aeration and oxygen distribution throughout the treatment bed.

The trial included a new system design for enhanced water-air exposure for improved aeration and distribution throughout the ABSORBS treatment bed. New design elements include:

(i) An arched, perforated tunnel for subterranean use, which has a larger internal void volume than conventionally used SPSF dosing pipework, and therefore lower velocity flow with greater water distribution over the wetted filter bed area, enabling the water more time to be treated and providing more opportunities for air-water exchange.

(ii) A pump for pressurizing wastewater dosing and distribution within the perforated tunnel, to enhance water aeration and dispersive transport to surrounding soil, while also reducing clogging potential.

The trial tested the hypothesis that the new tunnel and SPSF system will provide:

(i) Improved air-water exchange for greater air-to-water oxygen transfer of applied wastewater within the tunnel structure during dosing cycles, leading to enhanced biological activity and greater treatment performance as determined by the removal of wastewater organics and nutrients (e.g. ammonia).

(ii) Greater lateral transport of water than conventional ABSORBS treatment systems, providing for improved wastewater hydraulic distribution properties.

(iii) Lower vertical flow velocity through the sand bed providing a longer hydraulic residence time within the media bed for promotion of unsaturated flow conditions which yield improved oxygen transfer and longer contact of percolating wastewater with biofilms on sand media.

(iv) Improved lateral water distribution across the bed area during dosing as facilitated by the new tunnel design providing a reduced dead zone volume within the sand media.

(v) Enhanced interaction and/or transfer of wastewater with adjacent native soil for further enhancements in wastewater treatment efficacy via interactions with soil microbes and improved evapotranspiration losses.

Technical assessments to test the trial hypotheses included:

(i) Hydraulic conductivity and hydraulic residence time assessments.

(ii) Dissolved oxygen profiling of wastewater to validate enhanced air-water exchange.

(iii) Profiling of microbial communities throughout the sand bed (vertically and laterally).

(iv) Plant water use under conditions of highly wet soils held at or near field capacity.

Methods

Preliminary Trial Conditions

The trial was undertaken at a wastewater testing and research facility using a full-scale, fully functioning ABSORBS bed. This alleviated the recognized issues around pilot-scale testing and delivered results and outcomes that are immediately translatable to scaled operations.

Materials

Fluid Dispersion Tunnel

FIG. 1 illustrates a tunnel 100 for fluid diffusion according to embodiments of the invention. The tunnel 100 is modularized such that multiple tunnels may be detachably connected to each other to create a lengthened installation.

The front profile of tunnel 100 is generally shaped as a catenary arch while the length of tunnel 100, running perpendicular to the front profile, is substantially longer than the width of the catenary arch and ribbed along the length with stepped lateral corrugations 180 about the catenary arch, providing peaks forming outwardly corrugated portions 200 and troughs forming inwardly corrugated portions 210 on the outer surface and inverted peaks and troughs on the inner surface. Each of the outer peaks, or tunnel ribs 130, along the length of the tunnel 100 outer surface comprise lower vents 140 on each side, defined by three outlet holes situated in the proximity of the bottom most surface of the tunnel 100 and spread out along the bottom third of the height of the tunnel 100.

A channel 105 runs along the length of tunnel 100 at the height of the external troughs and through the tunnel ribs 130, with an open bottom defining a substantially convex rectangular cuboid shape defined by a top flat portion or channel base 120 defining the top surface and two lateral vents 110 defining each of the channel 105 walls within the outer troughs between each of the tunnel ribs 130. Each of the lateral vents 110 contain outlet holes along the length between each of the tunnel ribs 130 and of a size to fill a majority of the available surface area. The channel 105 is reinforced by structural supports running along each side of the outer surface of the flat portion 120 between each of the tunnel ribs 130, and two perpendicular structural supports at equal distances between each of the tunnel ribs 130.

Flat support surfaces or tunnel base 150 are formed at each of the bottom most edges of the tunnel 100 spanning the length of the tunnel 100 and from the bottom most edges of the outer surface troughs to approximately twice the depth of the corrugations in a lateral direction from the bottom edges to form a base for the tunnel 100 to sit upon.

Figure 2:
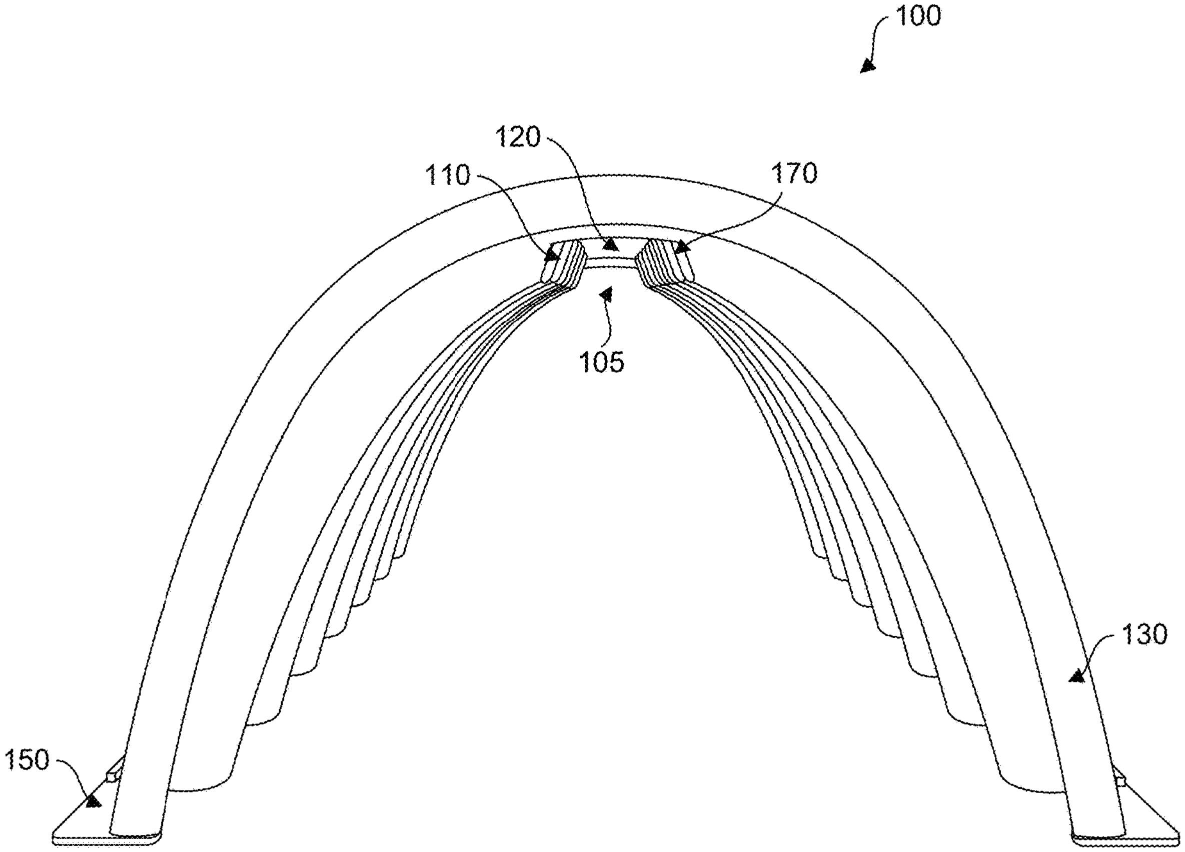
FIG. 2 illustrates a front view of a fluid dispersion tunnel according to embodiments of the invention.

FIG. 2 illustrates the catenary arch shape of the tunnel 100. The channel 105 is visible at the peak of the catenary arch and defined by the flat portion 120 at its peak and the lateral vents 110, formed within the channel sides 170, at near right angles from the flat portion 120 on each side below. The stepped corrugations, as seen on the outer surface of the tunnel 100, is inverted on the inside surface of the tunnel 100. The flat support surface or tunnel base 150 is illustrated on each side of the tunnel 100.

Figure 3:
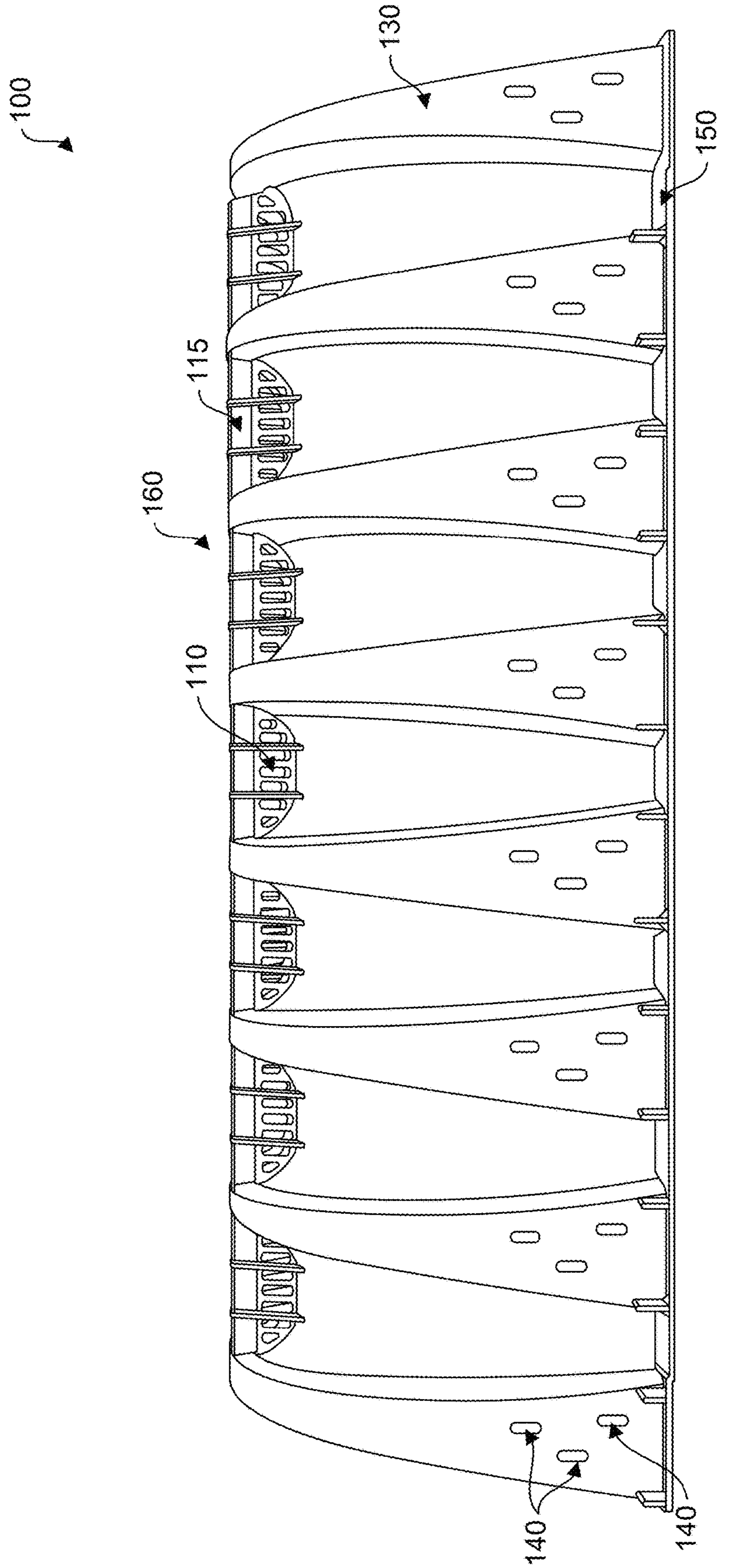
FIG. 3 illustrates a side view of a fluid dispersion tunnel according to embodiments of the invention.

FIG. 3 illustrates the side profile of the tunnel 100. The stepped corrugations of the tunnel 100 which define the tunnel ribs 130 illustrate that the bottom of each tunnel rib 130 is wider than the top width along the length of the tunnel 100 terminating in a channel section 160, while the top of each of the troughs is wider at the channel section 160 than the bottom width along the length of the tunnel 100. The channel 105 is visible between each of the tunnel ribs 130 wherein the lateral vents 110 are each comprised of a surface filling the space between the flat portion 120 and the trough surface of the outer stepped corrugations. Each channel 105 section between each pair of ribs 130 is strengthened by structural frame or structural spine 115 in both the front to back and lateral orientations. The lower vents 140 are illustrated in the bottom third of each of the tunnel ribs 130 and comprise three geometric stadium holes in a triangular pattern.

Figure 4:
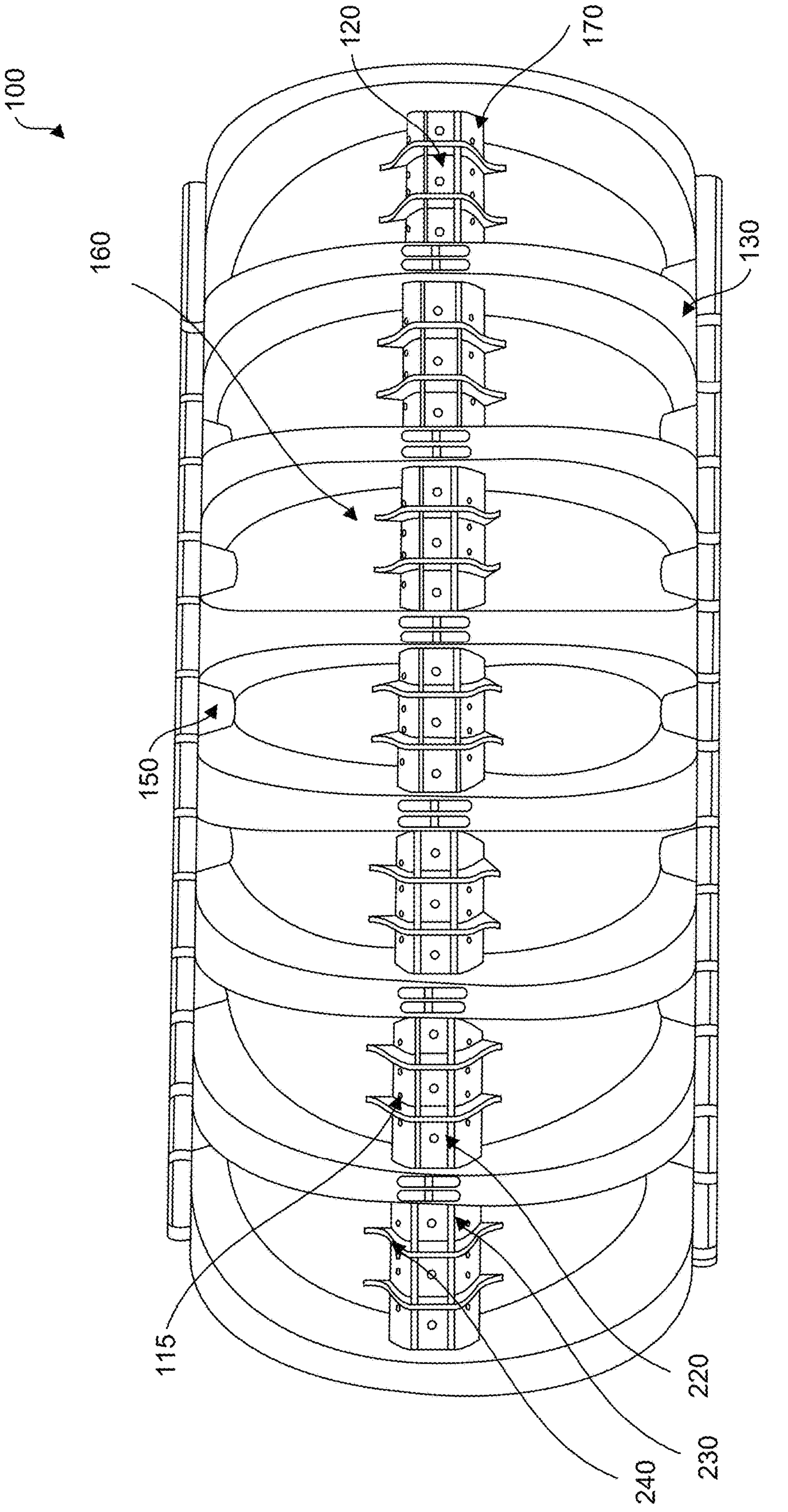
FIG. 4 illustrates a top view of a fluid dispersion tunnel according to embodiments of the invention.

FIG. 4 is a top perspective view of the tunnel 100 further illustrating the stepped corrugations with the peak of the tunnel 100 at the widest point of the troughs having a channel section 160 therebetween and narrowest point of the tunnel ribs 130. It further illustrates the channel 105 defined by the flat portion 120, lateral vents 110 formed through channel sides 170, and structural frame or structural spine 115. The structural frame or structural spine comprising a spine base 220, vertical longitudinal walls 230 and vertical sectional walls 240. The flat support surface or tunnel base 150 is visible as lateral extrusions from the bottom most edge of the outer corrugation surfaces.

Figure 5:
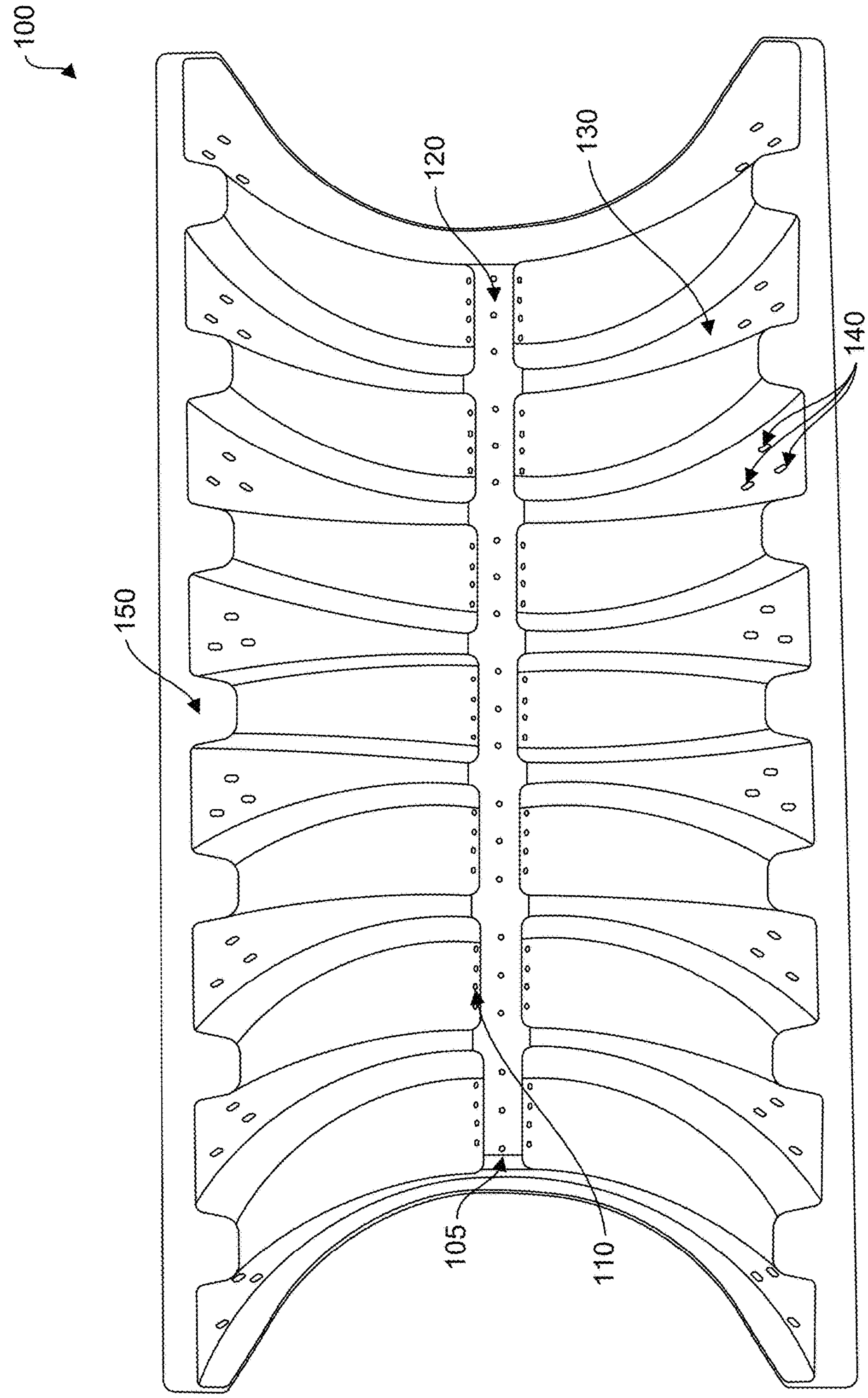
FIG. 5 illustrates a bottom view of a fluid dispersion tunnel according to embodiments of the invention.

FIG. 5 illustrates a bottom perspective view of the tunnel 100 further illustrating the channel 105 defined by the flat portion 120 running the length of the tunnel 100 and lateral vents 110 between each of the inverted tunnel ribs 130. The flat support surface or tunnel base 150 is visible as lateral extrusions from the bottom most edge of the outer corrugation surfaces.

Figure 6:
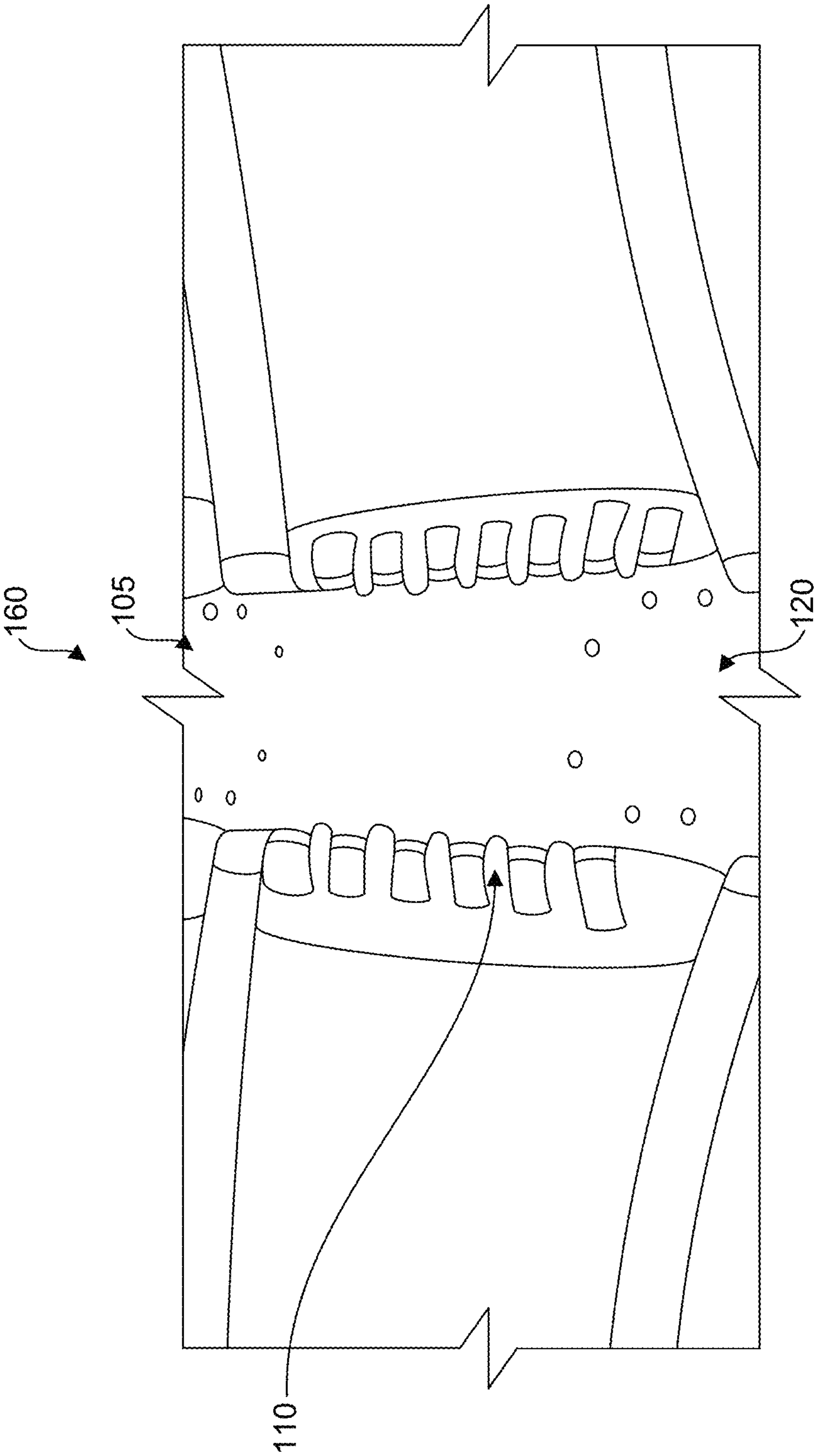
FIG. 6 illustrates a detailed bottom view of the top lateral vents formed between a top flat wall of a fluid dispersion tunnel according to embodiments of the invention.

FIG. 6 illustrates a detailed view of a channel section 160 and the channel 105 from the bottom perspective. The flat portion 120 runs the length of the tunnel 100 and is flanked by the lateral vents 110 formed through the channel sides 170 at a substantially perpendicular direction to the surface of the flat portion 120, and towards the bottom most surface of the tunnel 100. The surface of the lateral vents 110 is formed between the flat portion 120 and the surface of the trough within the stepped corrugations of the tunnel 100.

Tunnel End Cap

Figure 7:
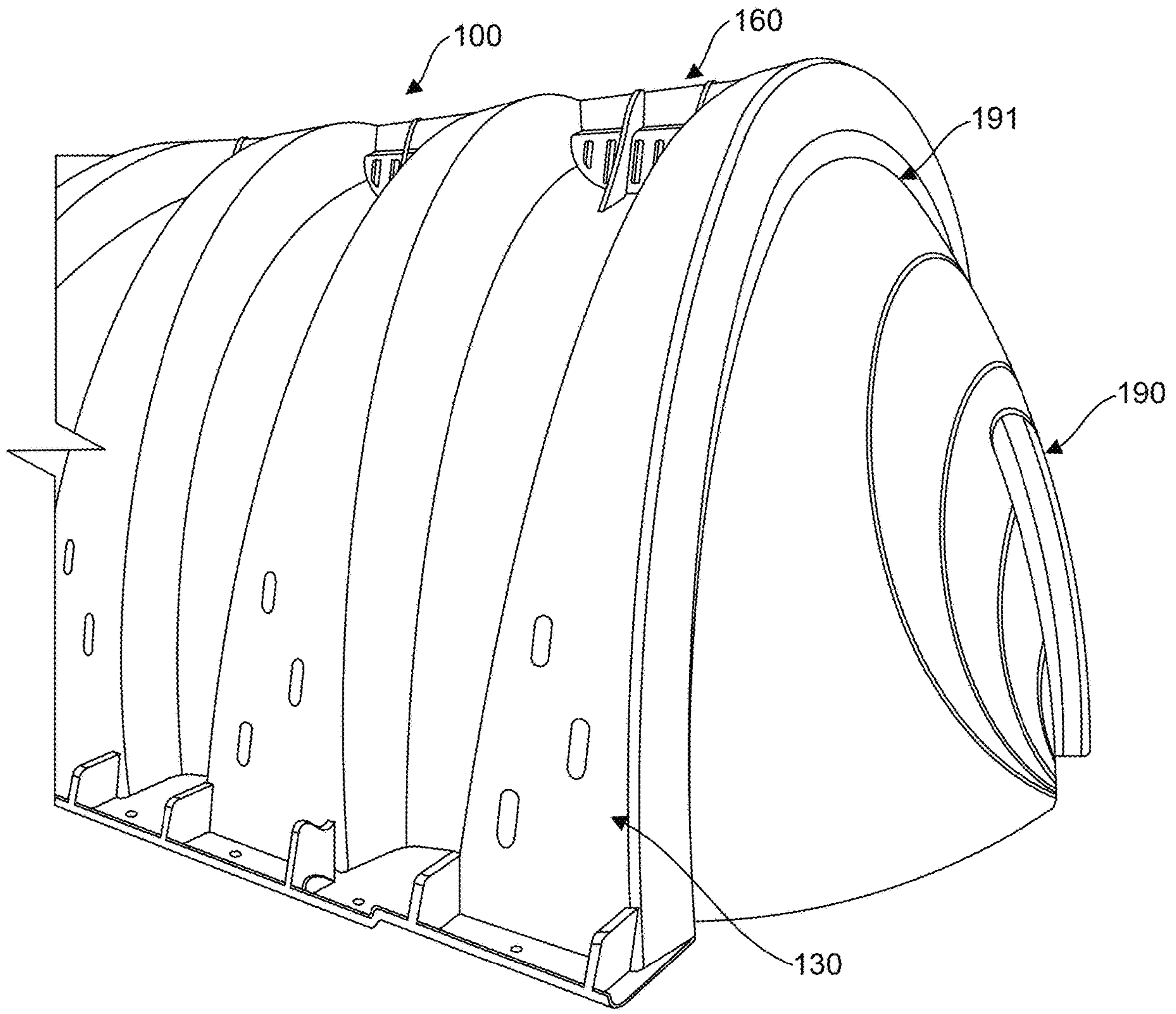
FIG. 7 illustrates a perspective view of a fluid diffusion tunnel end cap installed according to embodiments of the invention.

FIG. 7 illustrates a perspective view of tunnel 100 with a tunnel end cap 190, according to embodiments of the invention, installed at an end of the tunnel 100 closing the internal cavity formed by the tunnel 100 to the outside. Tunnel end cap 190 may comprise a hole allowing a wastewater pipe 500 to pass therethrough (not shown).

The front profile of tunnel end cap 190 is shaped to match the catenary arch of the tunnel 100 and contains an outer lip 191 to fit within the first of the tunnel ribs 130. Extending from the outer lip 191 is a hollow prolate spheroid quadrant, enclosed on the bottom, with a recessed channel extending from the center of the outer bottom edge to approximately the center of the spheroid quadrant.

Trivet

Figure 8:
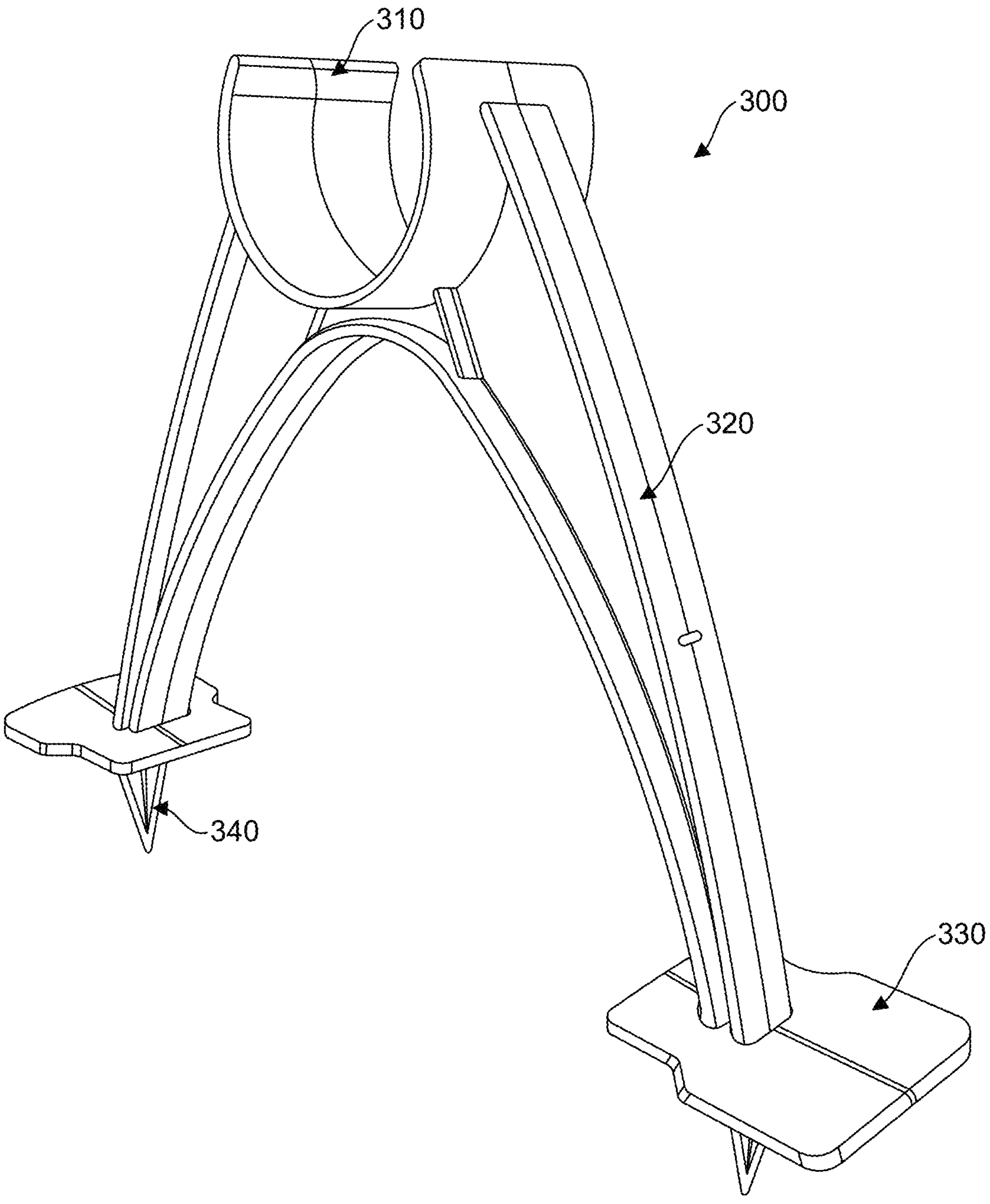
FIG. 8 illustrates a perspective view of a standalone pipe support trivet according to embodiments of the invention.

FIG. 8 illustrates a perspective view of a trivet 300 according to embodiments of the invention. Trivet 300 comprises a circular pipe support clip 310 at its top which is shaped to substantially surround a length of the lower half of wastewater pipe 500 (FIG. 13) to provide support thereon and has length in the direction of the wastewater pipe 500 approximately equal to the wastewater pipe 500 diameter. Trivet 300 further comprises two support legs 320 forming a supporting arch beneath the pipe support clip 310 and configured to support the wastewater pipe 500 at approximately the center of the tunnel 100 when installed within. Each support leg 320 comprises a flat stabilizing base 330 protruding laterally from the support leg 320 to provide a surface able to rest upon the ground and prevent the trivet 300 from tipping to either side, and a stake 340 below each stabilizing base for insertion into the ground beneath to prevent translatory movement of the trivet 300.

Figure 9:
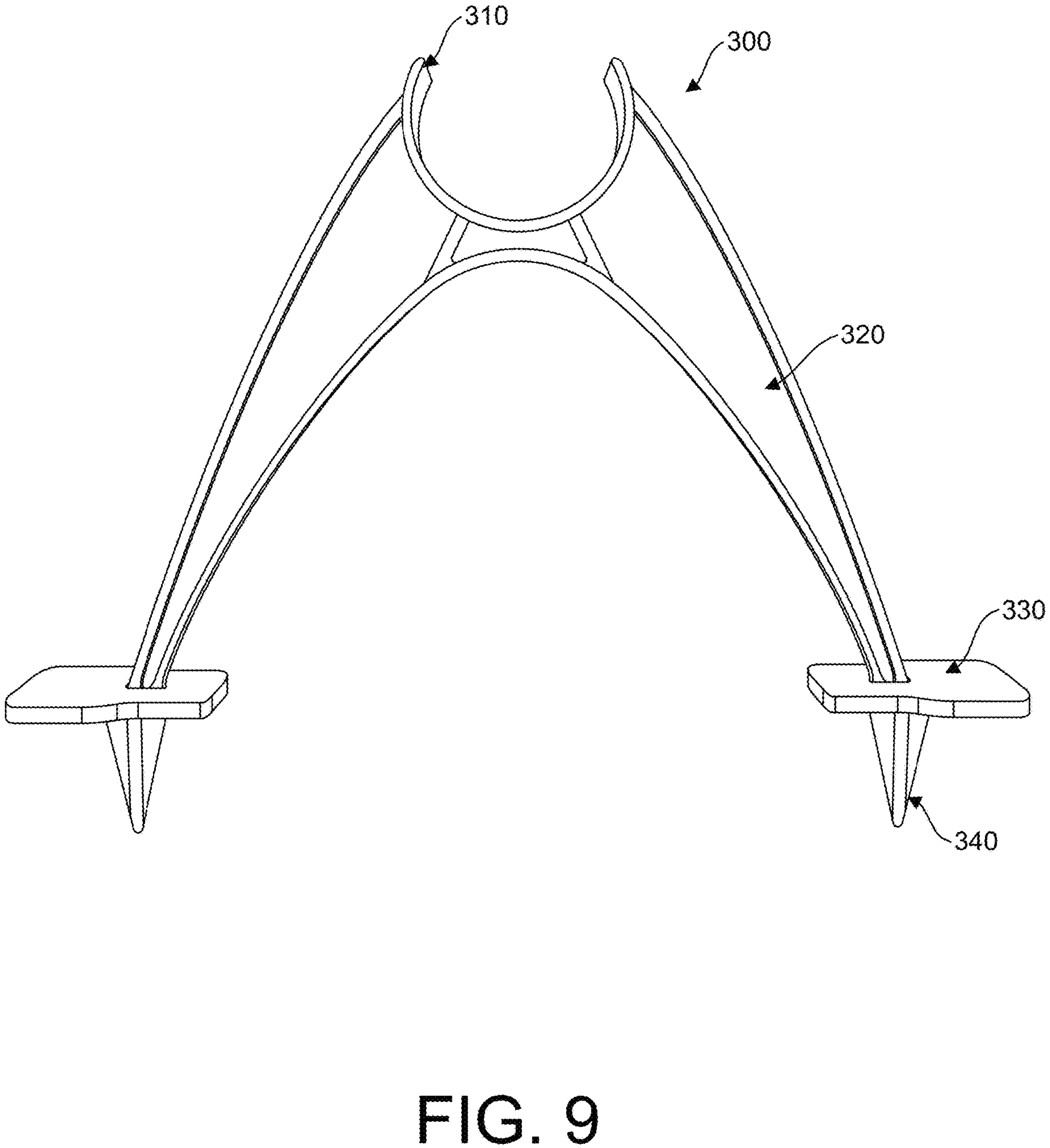
FIG. 9 illustrates a front view of a standalone pipe support trivet according to embodiments of the invention.

FIG. 9 illustrates a front view of trivet 300. Pipe support clip 310 is of a diameter to accept wastewater pipe 500 and surround approximately 190° of the wastewater pipe 500 perimeter. Support legs 320 form a support arch beneath pipe support clip 310 while also connecting to pipe support 310 at approximately 90° from vertical on each side and extending below at approximately 30° from vertical on each side. Stabilizing base 330 extends outwards from the center of trivet 300 at the bottom of each support leg 320. Stake 340 extends below the stabilizing base 330 and comprises four equal right angle triangular surfaces angled towards a point below in an arrowhead shape.

Figure 10:
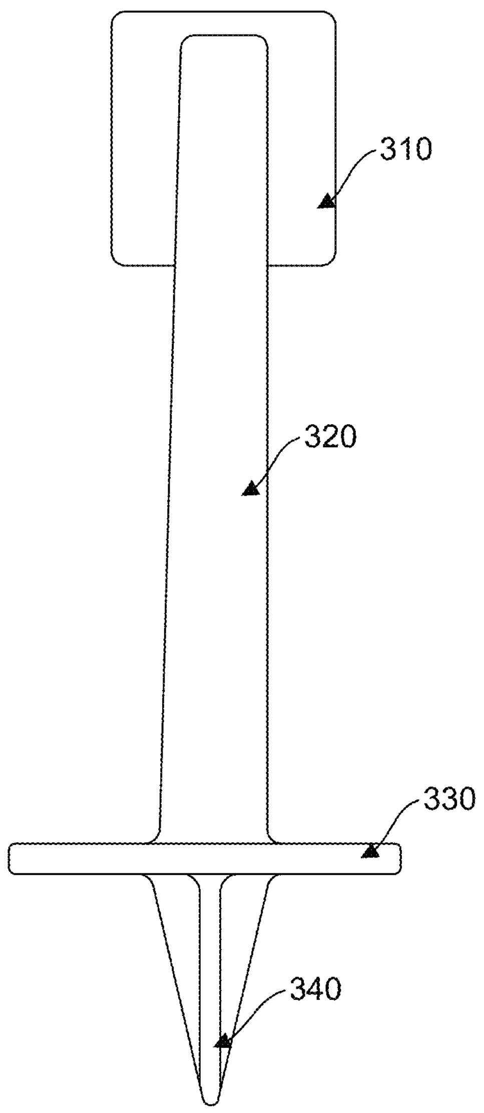
FIG. 10 illustrates a side view of a standalone pipe support trivet according to embodiments of the invention.

FIG. 10 illustrates a side view of trivet 300. This figure shows pipe support clip 310, support leg 320, stabilizing base 330, and stake 340.

System Components

Figure 11:
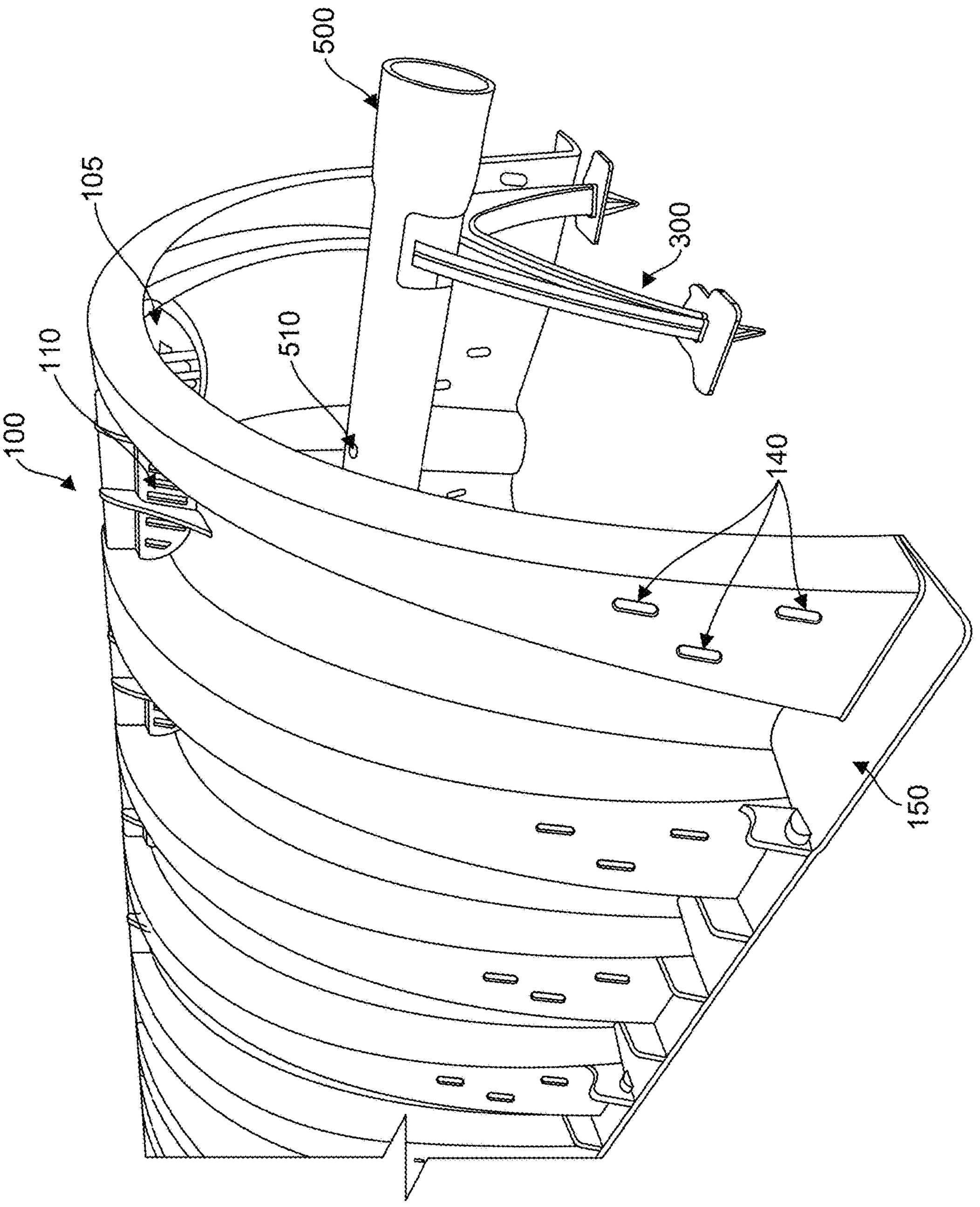
FIG. 11 illustrates a perspective view of a fluid dispersion tunnel with according to embodiments of the invention with a wastewater pipe and pipe support trivet installed according to embodiments of the invention.
Figure 12:
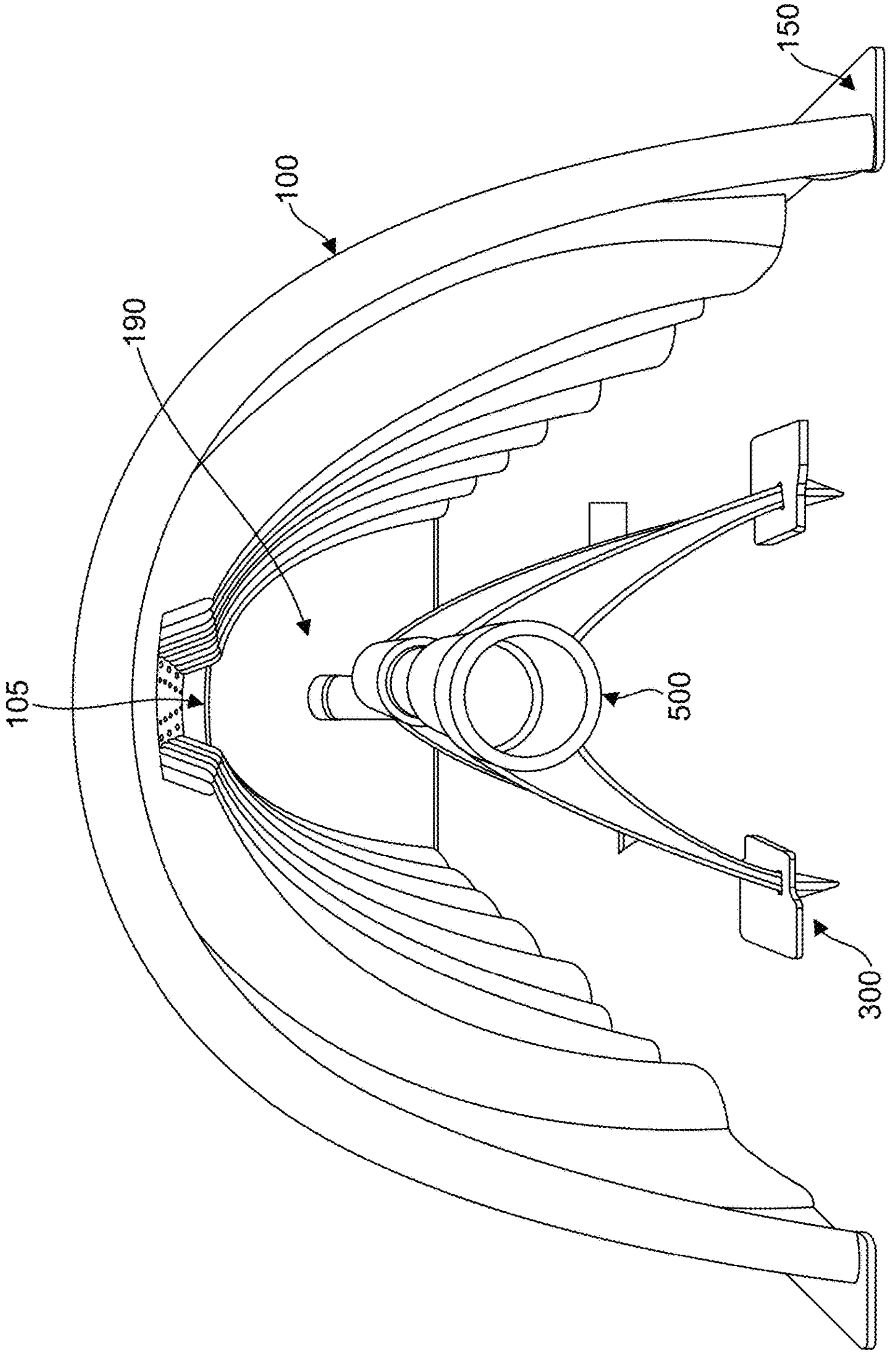
FIG. 12 illustrates a front view of a fluid dispersion tunnel with according to embodiments of the invention with a wastewater pipe, pipe support trivet, and end cap installed according to embodiments of the invention.
Figure 13:
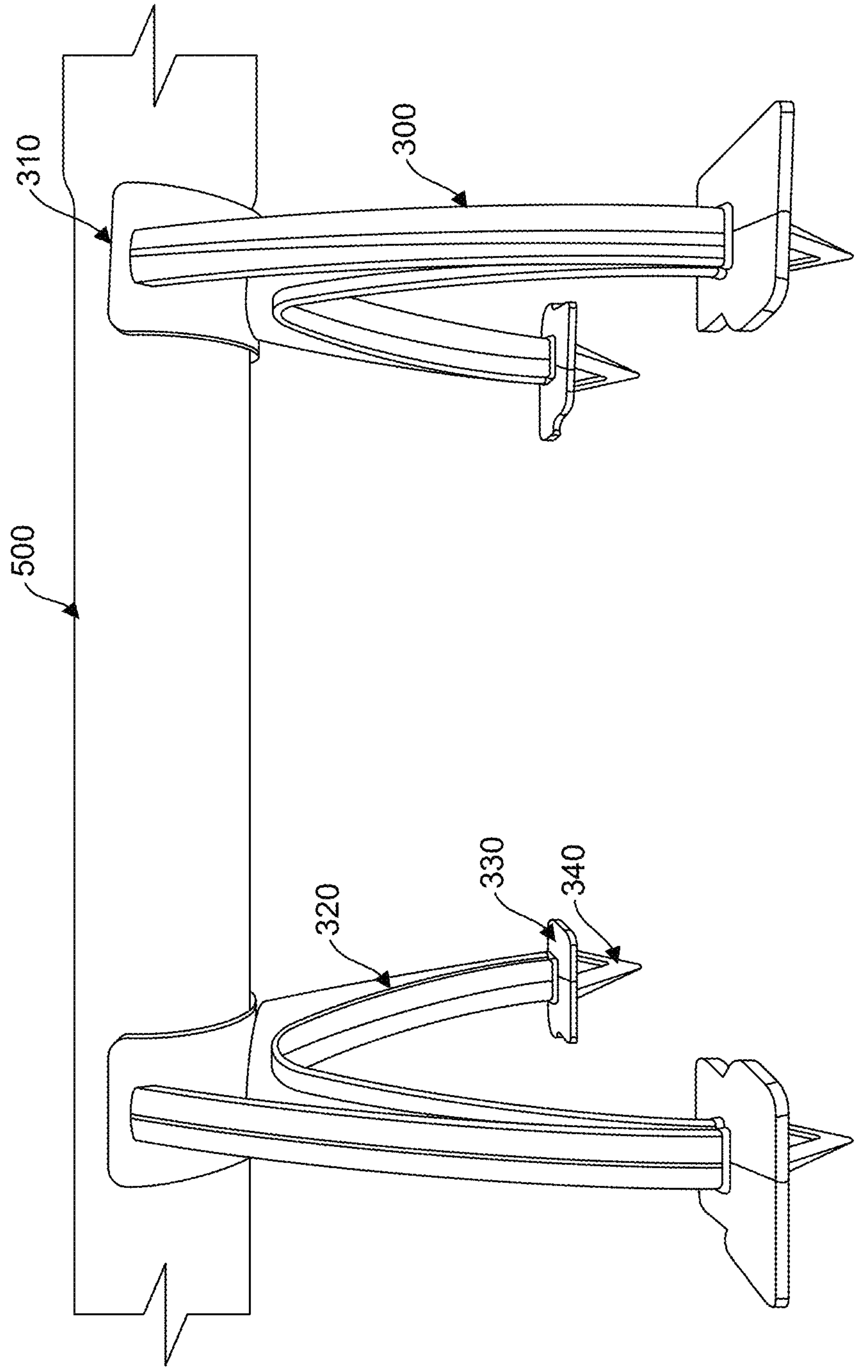
FIG. 13 illustrates a side view of a wastewater pipe supported by a pair of pipe support trivets according to embodiments of the invention.

FIGS. 11 and 12 illustrate the main components of the system according to embodiments of the invention comprising the tunnel 100, wastewater pipe 500, and trivet(s) 300 from a perspective view and a front view, respectively. FIG. 13 illustrates the combination of wastewater pipe 500 and trivets 300.

Wastewater pipe 500 is composed of modular pipe lengths and is inserted into the pipe support clip 310 of trivets 300 (FIG. 13). Wastewater pipe 500 comprises fluid outlet holes 510 which are oriented vertically in line with flat portion 120 and positioned beneath the center of lateral vents 110. The combination of the wastewater pipe 500 and trivets 300 is positioned under tunnel 100.

Trivets 300 are fixed bipod stakes which are configured to attach to wastewater pipe 500 at regular intervals and be staked into screened aggregate 920 and/or parent soil 900 (not shown) to provide a stable support and consistent distance from the flat portion 120 for wastewater pipe 500 during installation and operation of the system.

Once installed, a pump 950 (not shown) is activated to provide pressurized wastewater from a source such as a primary septic tank filtration outlet, wastewater pipe 500 is pressurized. Fluid outlet holes 510 allow for egress of the pressurized fluid from wastewater pipe 500 into the internal cavity defined by the tunnel 100 as a jet of wastewater. The jet of wastewater is oriented towards the flat portion 120 such that a dispersal of the jet of wastewater results from the stagnation point therebetween.

The dispersal of the jet of wastewater causes lateral travel in which some of the wastewater is sprayed through the lateral vents 110 to be absorbed into the native backfill 940 (not shown), while the remainder of the dispersed wastewater is diffused within the cavity of the tunnel 100 to cover the screened aggregate 920 (not shown) over the area exposed within the cavity of the tunnel 100.

Standard Single Pass Sand Filter Installation

Figure 14:
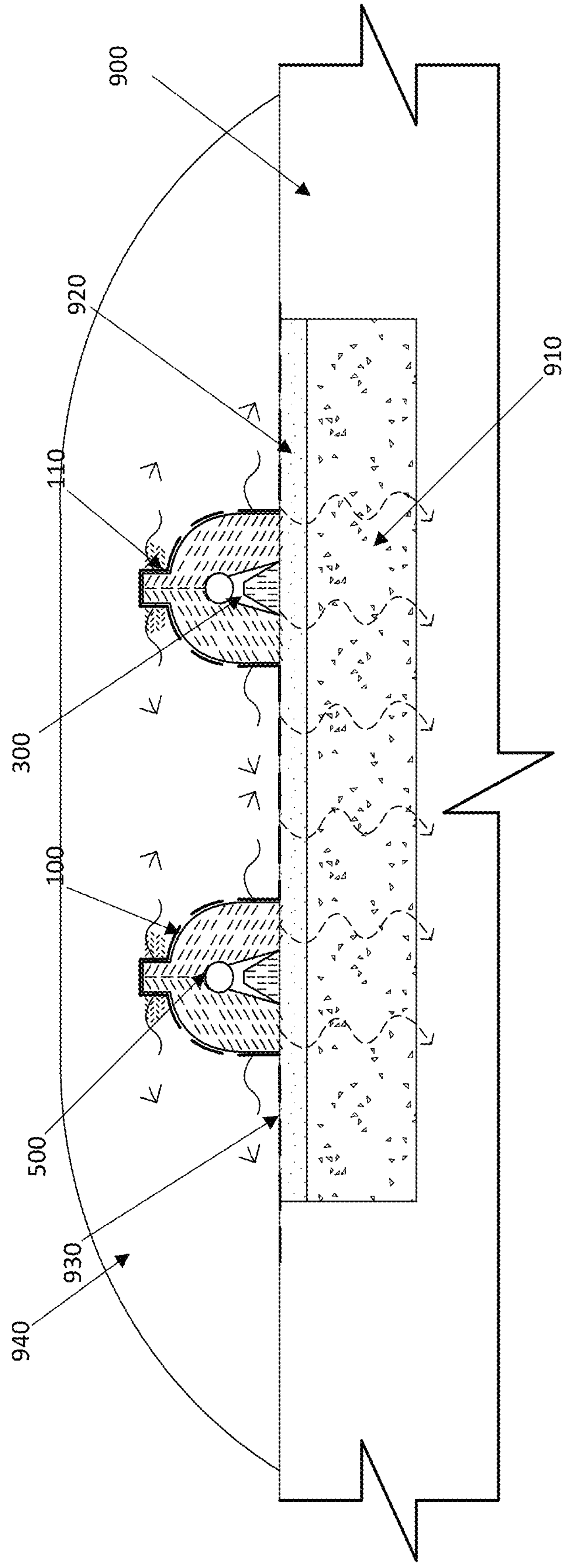
FIG. 14 illustrates a section front view of a standard single pass sand filter installation according to embodiments of the invention.
Figure 15:
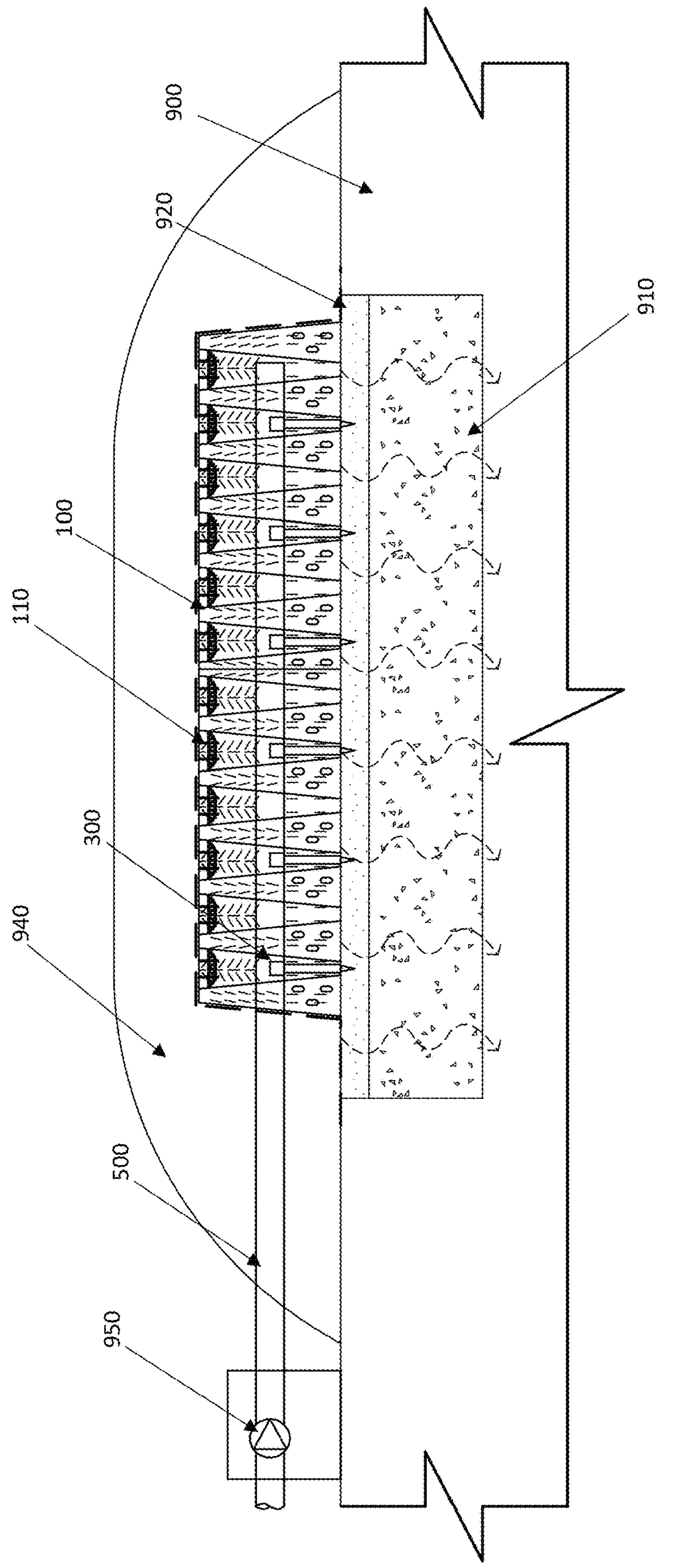
FIG. 15 illustrates a section side view of a standard single pass sand filter installation according to embodiments of the invention.

FIGS. 14 and 15 illustrate a standard installation of embodiments of the invention in a single pass sand filter system in both a section front view (14) and a section side view (15).

The parent soil 900 is excavated at the site of the filter system and the excavation filled with coarse filter sand 910, comprising 1-2 mm to coarse washed filter sand for a nominal depth of 50 cm, topped with screened aggregate 920 at 20 mm nominal size for a nominal depth of 20 cm. The wastewater pipe 500 is inserted into each of the trivets 300 which are staked into the aggregate 920 at suitable intervals to fully support the wastewater pipe 500 from a pump 950 to the end of the run.

The tunnel 100, is modularly installed over the length of the wastewater pipe 500 and covered with a geo-fabric liner 930 which also covers the extent of the aggregate 920. Native backfill 940 then covers the installation to at least 15 cm depth above the tunnel 100.

Flora (not shown) is then able to be planted within the native backfill 940.

Alternative Embodiment

Figure 16:
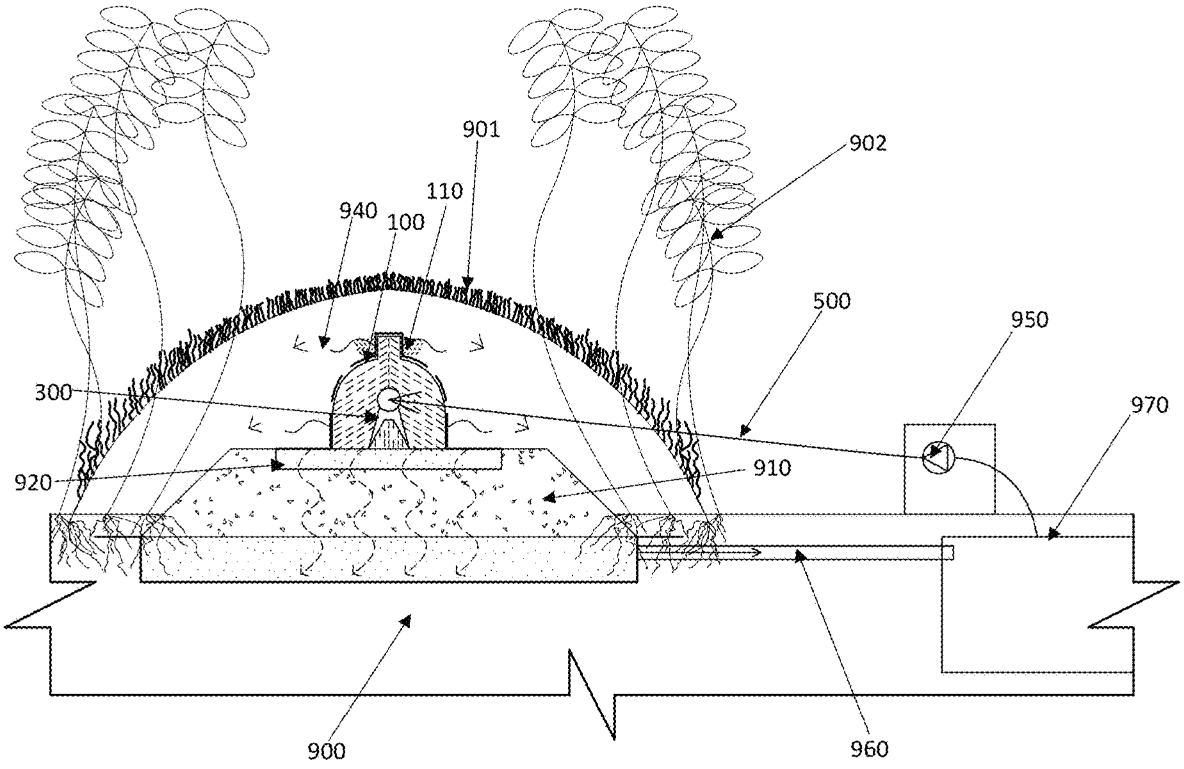
FIG. 16 illustrates a section front view of an alternative installation layout according to embodiments of the invention.

FIG. 16 illustrates an alternative installation embodiment for the system which further comprises an overflow pipe 960 from below the coarse filter sand 910 which is configured to return treated wastewater to the wastewater tank 970 when saturation levels increase beyond levels suitable for the secondary treatment system comprising the invention.

FIG. 16 further illustrates flora with roots having access to the vertically displaced effluent 902 as well as flora with roots having access to the horizontally displaced effluent 901. The flora with roots having access to the horizontally displaced effluent 901 are able to do so due to the interaction between the jet of wastewater and the flat portion 120 which creates a lateral dispersal of the jet of wastewater into the lateral vents 110 to be soaked into the native backfill 940 and accessed by the flora root system therein.

Results

Preliminary Trial Results

The Australian standard for on-site domestic wastewater treatment units secondary treatment systems was used as a baseline for comparison of the trial results and specifies minimum secondary treatment performance as being ≤20 mg/L for biochemical oxygen demand (BOD) and $30 mg/L for total suspended solids (TSS) for 90% of samples and a maximum of 30 mg/L for BOD and 45 mg/L for TSS.

Further to the minimum performance, there is an advanced secondary treatment performance defined which allows further usage of the treated effluent when compared to effluent treated to the secondary treatment levels. Advanced secondary treatment is defined as ≤10 mg/L for BOD and ≤10 mg/L for TSS for 90% of samples and a maximum of 20 mg/L for BOD and 20 mg/L for TSS.

Summary of the raw sewage quality and ABSORBS bed performance from validation testing (data collected April 2020-October 2020) is provided in Tables 1 and 2 below.

TABLE 1

Sewage BOD and TSS without ABSORBS treatment

| Influent sewage parameter | Average (mean) | Median | Maximum | $90^{th}$ % ile |
|---|---|---|---|---|
| $BOD_5$ (mg/L) | 240 | 260 | 330 | 300 |
| TSS (mg/L) | 341 | 338 | 613 | 447 |

TABLE 2

Sewage BOD and TSS with ABSORBS treatment

| Treated effluent parameter | Average (mean) | Median | Maximum | $90^{th}$ % ile |
|---|---|---|---|---|
| $BOD_5$ (mg/L) | 9 | 9 | 19 | 17 |
| TSS (mg/L) | 6 | 5 | 12 | 8 |

Figure 17:
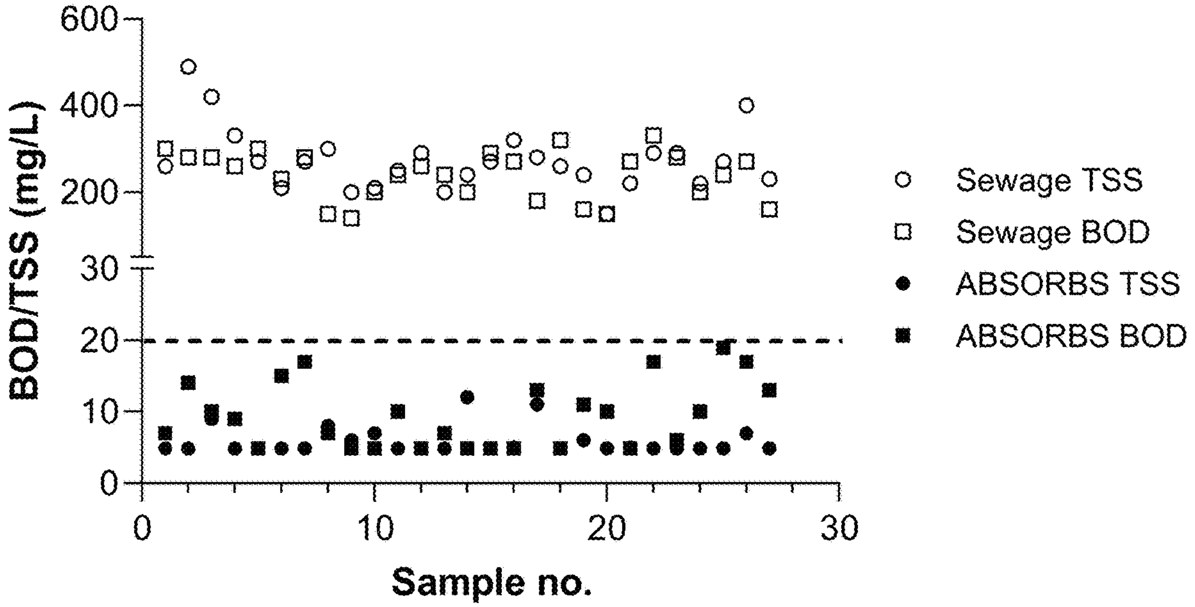
FIG. 17 illustrates a graphical summary of validation testing results with and without wastewater treatment according to embodiments of the invention.

FIG. 17 illustrates these results graphically and it can be seen from both the tabulated and graphical results that the effluent meets all requirements for secondary treatment under the Australian standard, while the TSS results also meet the requirements for advanced secondary treatment.

The results validate the parameters of the trial and allow for further trials in comparison to single pass sand filters known in the art to validate the increased efficiency and performance expected from the new tunnel design.

Alternative Embodiment in Native Soil

Figure 18:
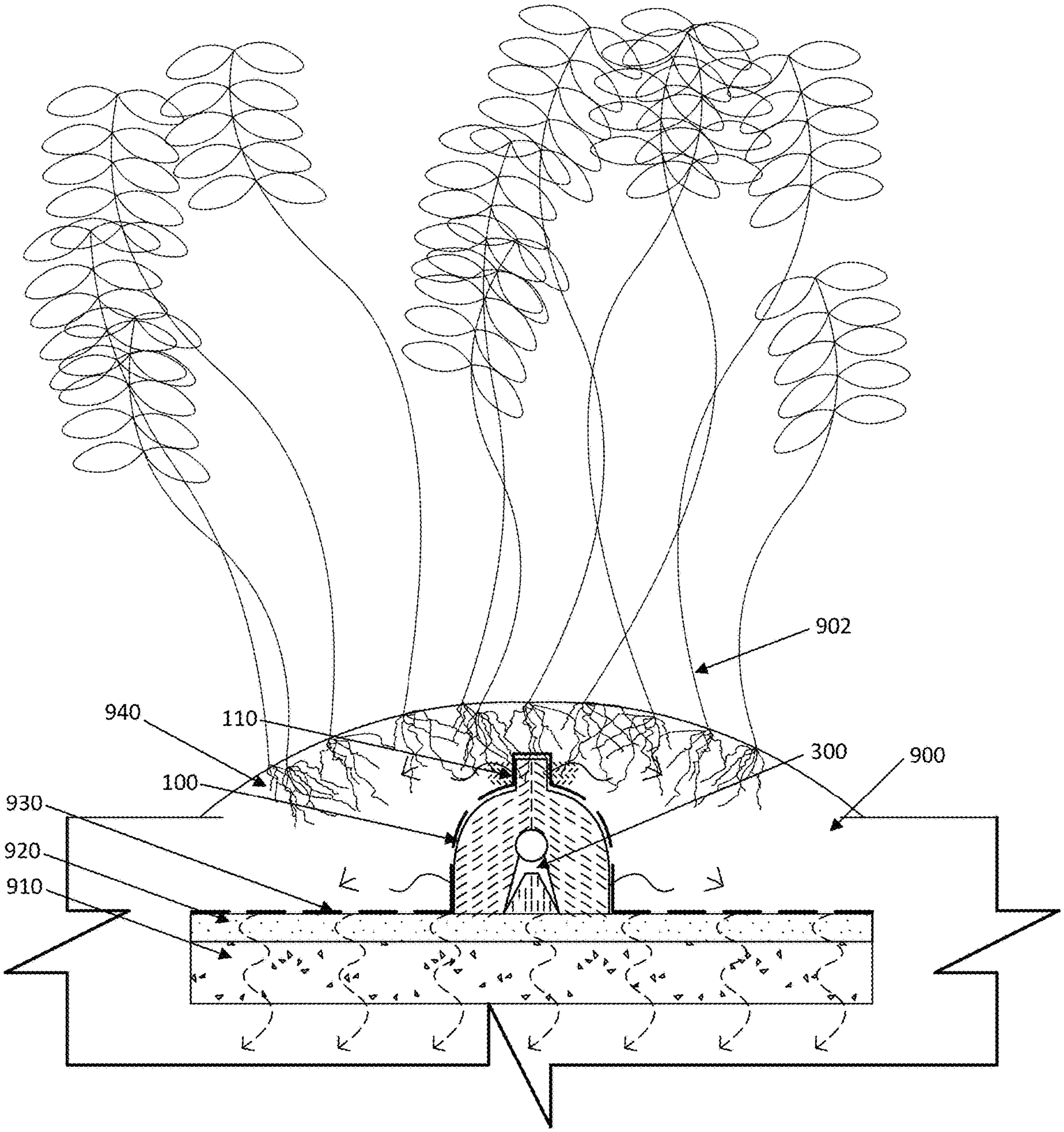
FIG. 18 illustrates a section front view of an alternative installation layout according to embodiments of the invention in the absence of a single pass sand filtration system.

FIG. 18 illustrates an installation of the system within native soil as an alternative to installation within a sand filter. A trench is dug approximately 1.6 m wide within native soil 900 and deep ripped to approximately 600 mm depth before being layered with 20 cm of 20 mm coarse screened aggregate 920. The trivets 300 are installed on screened aggregate 920 with wastewater pipe 500 within.

Tunnel 100 is placed over wastewater pipe 500 in an alignment such that fluid jets strike the peak of the tunnel and are directed through the lateral vents 110 to be absorbed throughout the native backfill 940. A geo-fabric liner 930 then covers the tunnel 100 and the screened aggregate 920 before the trench is filled with native backfill 940 and a mount is created on top of the tunnel 100 to a nominal depth of 15 cm above ground level.

Flora 902 is able to be planted within the mound of native backfill 940 where its root system is able to access the lateral dispersal of the water from wastewater pipe 500.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

It is appreciated the specific connection or attachment mechanisms, or methodologies used to connect two particular components of the fluid diffusion device, as described herein, may be utilized to connect other components of the sensing device, as may be desired.

The various components described herein may be made from any of a variety of materials including, for example, plastic, plastic resin such as polyethylene, polypropylene, nylon, composite material, or rubber, for example, or any other material as may be desired. For example, the tunnel of this disclosure may be produced from a plastic resin, such as polyethylene, and by injection molding. However, it is appreciated that other materials and manufacturing methods should be considered.

A variety of production techniques may be used to make the apparatuses and components described herein. For example, suitable injection molding and other molding techniques and other manufacturing techniques might be utilized. Also, the various components of the apparatuses may be integrally formed, as may be desired, in particular when using molding construction techniques. Also, the various components of the apparatuses may be formed in pieces and connected together in some manner, such as with suitable adhesive.

The various apparatuses and components of the apparatuses, as described herein, may be provided in various sizes and/or dimensions, as desired. Suitable sizes and/or dimensions will vary depending on the specifications of connecting components or the field of use, which may be selected by persons skilled in the art.

It will be appreciated that features, elements and/or characteristics described with respect to one embodiment of the disclosure may be used with other embodiments of the invention, as desired. It will also be appreciated that the effects of the present disclosure are not limited to the above-mentioned effects, and other effects, which are not mentioned herein, will be apparent to those in the art from the disclosure and accompanying claims.

Although the preferred embodiments of the present disclosure have been disclosed for illustrative purposes, those skilled in the art will appreciate that various modifications, additions and substitutions are possible, without departing from the scope and spirit of the disclosure and accompanying claims.

It will be understood that when an element or layer is referred to as being "on", "in contact with" or "within" another element or layer, the element or layer can be directly on or within another element or layer or intervening elements or layers. In contrast, when an element is referred to as being "directly on", "directly in contact with" or "directly within" another element or layer, there are no intervening elements or layers present.

As used herein, the term "and/or" includes any and all combinations of one or more of the associated listed items.

It will be understood that, although the terms first, second, third, etcetera, may be used herein to describe various elements, components, regions, layers and/or sections, these elements, components, regions, layers and/or sections should not be limited by these terms. These terms are only used to distinguish one element, component, region, layer or section from another region, layer, or section. Thus, a first element, component, region, layer, or section could be termed a second element, component, region, layer or section without departing from the teachings of the present disclosure.

Spatially relative terms, such as "lower", "upper", "top", "bottom", "left", "right" and the like, may be used herein for ease of description to describe the relationship of one element or feature to another element(s) or feature(s) as illustrated in the figures. It will be understood that spatially relative terms are intended to encompass different orientations of structures in use or operation, in addition to the orientation depicted in the drawing figures.

For example, if a device in the drawing figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein should be interpreted accordingly.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the description are described herein with reference to diagrams and/or cross-section illustrations, for example, that are schematic illustrations of preferred embodiments (and intermediate structures) of the description. As such, variations from the shapes of the illustrations as a result, for example, of manufacturing techniques and/or tolerances, are to be expected. Thus, embodiments of the description should not be construed as limited to the particular shapes of components illustrated herein but are to include deviations in shapes that result, for example, from manufacturing.

Unless otherwise defined, all terms (including technical and scientific terms) used herein have the same meaning as commonly understood by one of ordinary skill in the art to which this description belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the description. The appearances of such phrases in various places in the specification are not necessarily all referring to the same embodiment. Further, when a particular feature, structure, or characteristic is described in connection with any embodiment, it is within the purview of one skilled in the art to effect and/or use such feature, structure, or characteristic in connection with other ones of the embodiments.

Embodiments are also intended to include or otherwise cover methods of using and methods of manufacturing any or all of the elements disclosed above.

While the invention has been described above in terms of specific embodiments, it is to be understood that the invention is not limited to these disclosed embodiments. Upon reading the teachings of this disclosure many modifications and other embodiments of the invention will come to the mind of those skilled in the art to which this invention pertains, and which are intended to be and are covered by both this disclosure and the appended claims.

All publications mentioned in this specification are herein incorporated by reference. Any discussion of documents, acts, materials, devices, articles or the like which has been included in the present specification is solely for the purpose of providing a context for the present invention. It is not to be taken as an admission that any or all of these matters form part of the prior art baseline or were common general knowledge in the field relevant to the present invention as it existed in Australia or elsewhere before the priority date of each claim of this application.

It is indeed intended that the scope of the invention should be determined by proper interpretation and construction of the appended claims and their legal equivalents, as understood by those skilled in the art relying upon the disclosure in this specification and the attached drawings.

The invention claimed is:

1. An irrigation apparatus for diffusing a gas and liquid mixture within a soil or aggregate environment comprising:

a rigid tunnel elongated along a length, having an outer surface formed as a substantially convex surface and an inner surface formed as a substantially concave surface, wherein the inner surface of the rigid tunnel defines one or more channel sections formed along the length of the tunnel, the one or more channel sections comprising, a substantially horizontal, planar channel base positioned at a tunnel apex, and opposing channel sides having multiple apertures formed therethrough, located in proximity to the channel base, the rigid tunnel shaped substantially in the form of a catenary arch having lateral corrugations repeating along the length of the tunnel comprising multiple outwardly corrugated portions interspersed by inwardly corrugated portions, the rigid tunnel comprising a tunnel base formed along the length of the tunnel at an edge of the rigid tunnel for maintaining the rigid tunnel at a desired position, each outwardly protruding lateral corrugation being wider at the tunnel base than the tunnel apex, and the outwardly protruding lateral corrugations comprising apertures formed therethrough in proximity to the tunnel base wherein the rigid tunnel is adapted to receive a pressurized gas and liquid mixture within a perforated fluid pipe having perforations along it's length positioned beneath the substantially concave surface of the rigid tunnel, the rigid tunnel being capable of use with the perforated fluid pipe and one or more supporting means so as to direct the pressurized mixture through the perforations in the pipe to strike the channel base and aerosolize the mixture.

2. The irrigation apparatus according to claim 1 comprising a structural spine positioned on the outer surface of the rigid tunnel at the tunnel apex wherein the structural spine is configured to provide weight bearing structural support along the length of the tunnel.

3. The irrigation apparatus according to claim 2 wherein;

the structural spine is formed in portions, each portion of the structural spine being formed within a space between the outwardly corrugated portions of the rigid tunnel defined by the inwardly corrugated portions of the tunnel, and each portion of the structural spine comprises a substantially horizontal, planar spine base and multiple vertical longitudinal walls perpendicularly intersecting multiple vertical sectional walls, configured to provide weight bearing structural support along the length of the tunnel.

4. The irrigation apparatus according to claim 1, wherein the apertures formed through the rigid tunnel are elongated, the apertures positioned in proximity to the channel base are configured to vent aerosolized liquid therethrough and the apertures positioned in proximity to the tunnel base are configured to vent liquid within the rigid tunnel therethrough.

5. The irrigation apparatus according to claim 1 comprising:

the perforated fluid pipe having perforations along it's length adjacent to the inner surface of the rigid tunnel positioned to substantially align with the channel base, the one or more supporting means for holding the fluid pipe at a position to substantially align with the channel base, whereby the irrigation apparatus is adapted to receive a pressurized gas and liquid mixture within the perforated fluid pipe, and the perforated fluid pipe is positioned to direct the pressurized mixture through the perforations in the pipe to strike the channel base and aerosolize the mixture.

6. The irrigation apparatus according to claim 1 comprising an absorbent membrane liner adjacent to the outer surface of the rigid tunnel configured to direct a movement of moisture therethrough.

* * * * *